US011220573B2

(12) United States Patent
Mei et al.

(10) Patent No.: US 11,220,573 B2
(45) Date of Patent: Jan. 11, 2022

(54) ELECTROCHROMIC POLYMERS WITH AMIDE-CONTAINING SIDE CHAINS AND METHODS OF FABRICATING SAME AND ELECTROCHROMIC DEVICE CONTAINING SAME

(71) Applicant: AMBILIGHT INC., Milpitas, CA (US)

(72) Inventors: Jianguo Mei, West Lafayette, IN (US); Liyan You, West Lafayette, IN (US)

(73) Assignee: AMBILIGHT INC., Milpitas, CA (US)

( * ) Notice: Subject to any disclaimer, the term of this patent is extended or adjusted under 35 U.S.C. 154(b) by 37 days.

(21) Appl. No.: 16/796,768

(22) Filed: Feb. 20, 2020

(65) Prior Publication Data
US 2021/0017328 A1    Jan. 21, 2021

Related U.S. Application Data

(60) Provisional application No. 62/875,853, filed on Jul. 18, 2019.

(51) Int. Cl.
*C08G 61/12*    (2006.01)

(52) U.S. Cl.
CPC ........ *C08G 61/126* (2013.01); *C08G 2261/11* (2013.01); *C08G 2261/149* (2013.01); *C08G 2261/1432* (2013.01); *C08G 2261/3243* (2013.01); *C08G 2261/90* (2013.01)

(58) Field of Classification Search
CPC ................ C08G 61/123; C08G 61/126; C08G 2261/12; C08G 2261/228; C08G 2261/312; C08G 2261/314; C08G 2261/3246; C08G 2261/3243; C08G 2261/3241; C08G 2261/3242; C08G 2261/54; C09K 9/02; C09K 2211/1491; C09K 2211/1483; C09K 2211/1458; C09K 2211/1466; C09K 2211/145; C09K 2211/1425; C09K 2211/1416
See application file for complete search history.

(56) References Cited

U.S. PATENT DOCUMENTS

2017/0321002 A1* 11/2017 Mei .................... C08G 61/123

OTHER PUBLICATIONS

Chad M. Amb et al., "Navigating the Color Palette of Solution-Processable Electrochromic Polymers", Chemistry of Materials Review, 2011, vol. 23, pp. 397-415.

(Continued)

*Primary Examiner* — Shane Fang
(74) *Attorney, Agent, or Firm* — Sheppard Mullin Richter & Hampton LLP

(57) ABSTRACT

The present invention generally relates to electrochromic compounds, the synthesis method and the uses thereof, particularly to a family of conjugated electrochromic polymers containing solubilizing side chains, where at least one side chain contains amide functional groups. The disclosed conjugated electrochromic polymers with amide-containing side chains demonstrated excellent redox switching in not only organic but also aqueous media while maintaining high photo contrast. The presence of the amide groups is also beneficial when it comes to lower the oxidation onset potential of the polymers, making them attractive candidates for electrochromic in aqueous environment.

18 Claims, 12 Drawing Sheets

(56) References Cited

OTHER PUBLICATIONS

Pierre M. Beaujuge et al., "Color Control in π-Conjugated Organic Polymers for Use in Electrochromic Devices", Chem. Rev., 2010, vol. 110, pp. 268-320.

Guofa Cai et al., "Next-Generation Multifunctional Electrochromic Devices", Accounts of Chemical Research, 2016, vol. 49, pp. 1469-1476.

Jacob Jensen et al., "From the Bottom Up—Flexible Solid State Electrochromic Devices", Advanced Materials, 2014, vol. 26, pp. 7231-7234.

Jeonghun Kim et al., "Solution Processable and Patternable Poly(3,4-alkylenedioxythiophene)s for Large-Area Electrochromic Films", Advanced Materials, 2011, vol. 23, pp. 4168-4173.

Anil Kumar et al., "Conducting Poly(3,4-alkylenedioxythiopene) Derivatives as Fast Electrochromics with High-Contrast Ratios", Chem. Mater., 1998, vol. 10, pp. 896-902.

Dean M. Welsh et al., "Fast Electrochromic Polymers Based on New Poly(3,4-alkylenedioxythiophene) Derivatives", Synthetic Materials, 1999, vol. 102, pp. 967-968.

Dean M. Welsh et al., "Regiosymmetric Dibutyl-Substituted Poly(3,4-propylenedioxythiophene)s as Highly Electron-Rich Electroactive and Luminescent Polymers", Macromolecules, 2002, vol. 35, pp. 6517-6525.

Carleton L. Gaupp et al., "Poly(ProDOT-Et2): A High-Contrast, High-Coloration Efficiency Electrochromic Polymer", Macromol. Rapid Commun., 2002, vol. 23, pp. 885-889.

Michael Dietrich et al., "Electrochemical and spectroscopic characterization of polyalkylenedioxythiophenes", Journal of Electroanalytical Chemistry, 1994, vol. 369, pp. 87-92.

Jurgen Heinze et al., "Electrochemistry of Conducting Polymers—Persistent Models and New Concepts", Chem. Rev., 2010, vol. 110, pp. 4724-4771.

Jonathan Rivnay et al., "Structural Control of mixed ionic and electronic transport in conducting polymers", Nature Communications | DOI: 10.1038/ncomms11287, Apr. 19, 2016.

Richard P. Swatloski et al., "Ionic liquids are not always green: hydrolysis of 1-butyl-3-methylimidazolium hexafluorophosphate", Green Chemistry, 2003, vol. 5, pp. 361-363.

Melecita M. Archuleta, Toxicity of materials used in the manufacture of lithium batteries, Journal of Power Sources, 1995, vol. 54, pp. 138-142.

Anna Hakansson et al., "Effect of (3-Glycidyloxypropyl)Trimethoxysilane (GOPS) on the Electrical Properties of PEDOT:PSS Films", Journal of Polymer Science, Part B: Polymer Physics, 2017, vol. 55, pp. 814-820.

Tsang-Min Huang et al., Chemical cross-linking of conducting poly(3,4-ethylenedioxythiophene):poly(styrenesulfonate) (PEDOT:PSS) using poly(ethylene oxide) (PEO), Polymer, 2013, vol. 54, pp. 6455-6462.

James E. Ponder, Jr. et al., "Conjugated Polyelectrolytes as Water Processable Precursors to Aqueous Compatible Redox Active Polymers for Diverse Applications: Electrochromism, Charge Storage, and Biocompatible Organic Electronics", Chemistry of Materials, 2017, vol. 29, pp. 4385-4392.

Davide Moia et al., "Design and evaluation of conjugated polymers with polar side chains as electrode materials for electrochemical energy storage in aqueous electrolytes", Energy Environ. Sci., 2019, vol. 12, pp. 1349-1357.

Anna Maria Pappa et al., "Direct metabolite detection with an n-type accumulation mode organic electrochemical transistor", Sci. Adv., Jun. 22, 2018, vol. 4, pp. 1-7.

Alexander Giovannitti et al., "The Role of the Side Chain on the Performance of N-type Conjugated Polymers in Aqueous Electrolytes", Chemistry of Materials, 2018, vol. 30, pp. 2945-2953.

Lisa R. Savagian et al., Balancing Charge Storage and Mobility in an Oligo(Ether) Functionalized Dioxythiophene Copolymer for Organic- and Aqueous-Based Electrochemical Devices and Transistors, Advanced Materials, 2018, vol. 30, 1804647, pp. 1-6.

Graham S. Collier et al., "Aqueous Electrolyte Compatible Electrochromic Polymers Processed from an Environmentally Sustainable Solvent", ACS Macro Letters, 2018, vol. 7, pp. 1208-1214.

Niccolo Peruzzi et al., "The Solvation of Anions in Propylene Carbonate", J. Solution Chem., 2015, vol. 44, pp. 1224-1239.

Aubrey L. Dyer et al., "Conjugated Electrochromic Polymers: Structure-Driven Colour and Processing Control", Electrochromic Materials and Devices, First Edition, 2015, Wiley-VCH Verlag GmbH & Co. KGaA, pp. 113-183.

Graham S. Collier et al., "Electrochromic Polymers Processed from Environmentally Benign Solvents", Chemistry of Materials, 2018, vol. 30, pp. 5151-5168.

\* cited by examiner

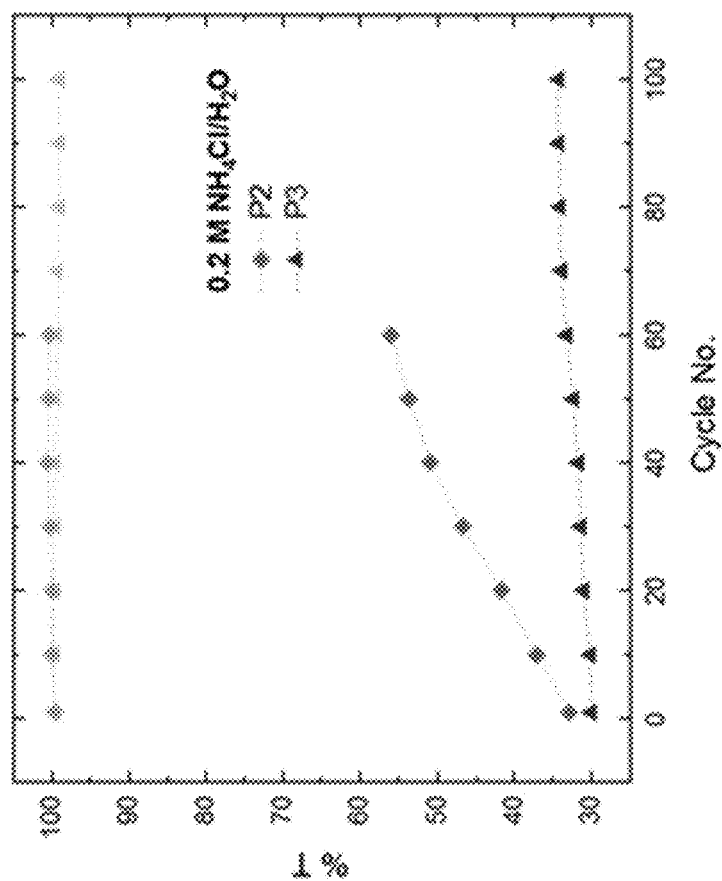
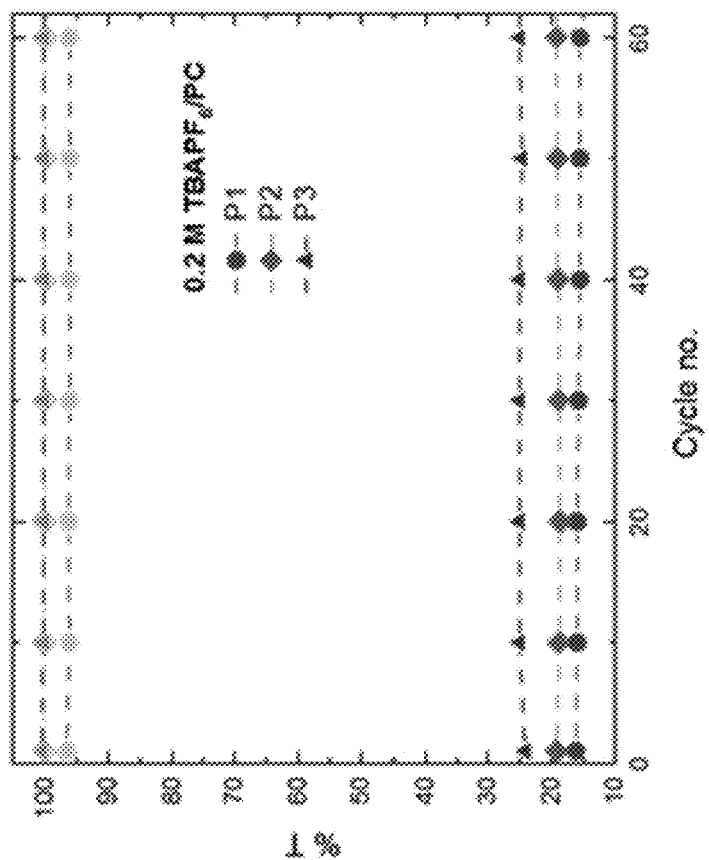
FIG. 8B
FIG. 8A

ELECTROCHROMIC POLYMERS WITH AMIDE-CONTAINING SIDE CHAINS AND METHODS OF FABRICATING SAME AND ELECTROCHROMIC DEVICE CONTAINING SAME

CROSS REFERENCE TO RELATED APPLICATIONS

This application claims benefits of U.S. provisional application No. 62/875,853 filed Jul. 18, 2019, the content of which is incorporated by reference herein in its entirety.

TECHNICAL FIELD

The present invention generally relates to electrochromic compounds, the synthesis method and the uses thereof, particularly to a family of conjugated electrochromic polymers containing solubilizing side chains, where at least one side chain contains amide functional groups. Both compositions and process for manufacturing thereof and electrochromic device containing same are in the scope of this invention.

BACKGROUND OF THE INVENTION

This section introduces aspects that may help facilitate a better understanding of the disclosure. Accordingly, these statements are to be read in this light and are not to be understood as admissions about what is or is not prior art.

The concept of using electrochromic devices to modulate light and heat through windows has been studied for nearly half a decade. Current commercial electrochromic devices, mainly based on inorganic metal oxides and soluble small molecules, lack versatility in terms of color tuning, switching speed, and ease of processing. The rise of conjugated polymers as electrochromic materials show promise in terms of cost-effective large area manufacturing due to their inherent flexibility and solution processability rendering them compatible with roll-to-roll manufacturing techniques, but are also attractive in terms of the availability of a rich library of colors and switching speeds ranging between milliseconds to seconds. Due to the hydrophobic nature of most electrochromic polymers, electrolytes containing mostly hydrophobic salts and ionic liquids dissolved in polar aprotic organic solvents are employed in electrochromic devices which are expensive and may even pose health and environmental hazards upon disposal. It is beneficial to look for greener alternatives of conjugated polymers that are readily switchable in aqueous electrolytes containing common salts such as sodium or ammonium chloride. Such polymers would also be suitable for bio-electronic applications such as organoelectrochemical transistors and sensors that enable interaction and transduction across biological fluids.

The common strategy for designing aqueous electrolyte compatible conjugated polymers is to incorporate multiple polar functional groups, such as oligoethers and multiple ester in the polymer sidechains. The increased polarity poses several problems difficult purification and characterization, and inapplicability to test in organic electrolytes due to film delamination (hence comparison of effects of solvation cannot be performed). Therefore, it is of prime importance to explore different chemical functionalities capable of affording electro-activity in both organic and aqueous media with a minimum number of substitutions.

Among the various polymers that have been studied, those based on propylenedioythiophene (ProDOT) exhibit excellent electrochromic performance. A large number of electrochromic polymers are made by ProDOT with different colors. High contrast, stable and fast switching poly (ProDOT) versions have been achieved through side chain modifications and copolymerization. However, it remains to be explored what types of polar functional groups are most effective in bringing about redox activity in aqueous salts, with a minimum number of polar group substituents.

These and other features, aspects and advantages of the present invention will become better understood with reference to the following detailed description and claims.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings below.

FIG. 8A is a diagram showing electrochromic switching stability in 0.2 M TBPF$_6$/PC in a three-electrode setup, according to one example embodiment.

FIG. 8B is a diagram showing electrochromic switching stability in 0.2 M NH$_4$Cl/H$_2$O in a three-electrode setup, according to one example embodiment.

DETAILED DESCRIPTION OF EMBODIMENTS

Figure 1B:
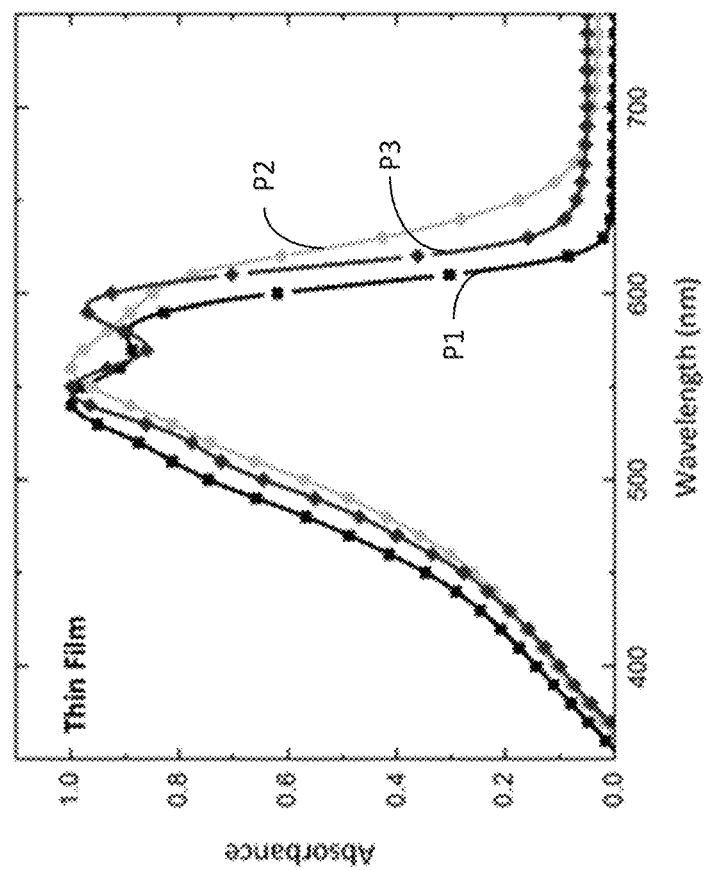
FIG. 1B is normalized absorption spectra of as-cast (pristine) thin films of ProDOT polymers according to one example embodiment.

While the concepts of the present disclosure are illustrated and described in detail in the description herein, results in the description are to be considered as exemplary and not restrictive in character; it being understood that only the illustrative embodiments are shown and described and that all changes and modifications that come within the spirit of the disclosure are desired to be protected.

In some illustrative embodiments, the present invention relates to a compound comprising the formula:

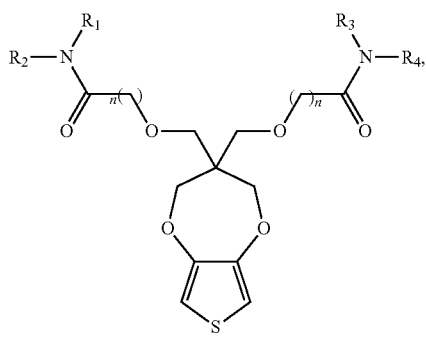

wherein each of $R_1$, $R_2$, $R_3$, and $R_4$ is, but not limited to, independently hydrogen, $C_1$-$C_{30}$ alkyl, $C_2$-$C_{30}$ alkenyl, $C_2$-$C_{30}$ alkynyl, $C_2$-$C_{30}$ alkylcarbonyl, $C_1$-$C_{30}$ alkoxy, $C_3$-$C_{30}$ alkoxyalkyl, $C_2$-$C_{30}$ alkoxycarbonyl, $C_4$-$C_{30}$ alkoxycarbonylalkyl, $C_1$-$C_{30}$ aminylcarbonyl, $C_4$-$C_{30}$ aminylalkyl, $C_1$-$C_{30}$ alkylaminyl, $C_1$-$C_{30}$alkylsulfonyl, $C_3$-$C_{30}$ alkylsulfonylalkyl, $C_6$-$C_{18}$ aryl, $C_3$-$C_{15}$ cycloalkyl, $C_3$-$C_{30}$ cycloalkylaminyl, $C_5$-$C_{30}$ cycloalkylalkylaminyl, $C_1$-$C_{30}$cycloalkylalkyl, $C_5$-$C_{30}$ cycloalkylalkyloxy, $C_1$-$C_{12}$ heterocyclyl, $C_1$-$C_{12}$heterocyclyloxy, $C_3$-$C_{30}$ heterocyclylalkyloxy, $C_1$-$C_{30}$heterocyclylalkyloxy, $C_1$-$C_{30}$ heterocyclylaminyl, $C_5$-$C_{30}$heterocyclylalkylaminyl, $C_2$-$C_{12}$ heterocyclylcarbonyl, $C_3$-$C_{30}$heterocyclylalkyl, $C_1$-$C_{13}$ heteroaryl, or $C_3$-$C_{30}$ heteroarylalkyl; n is an integer greater than 0.

In some illustrative embodiments, the present invention relates to a compound comprising the formula:

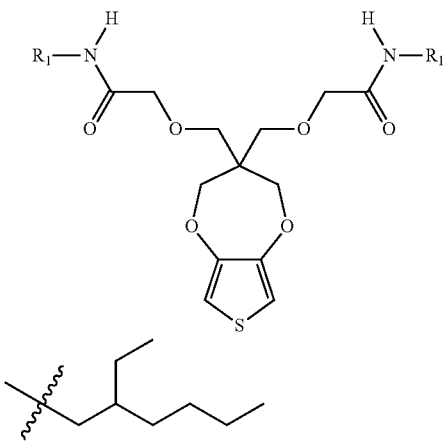

In some illustrative embodiments, the present invention relates to a compound comprising the formula:

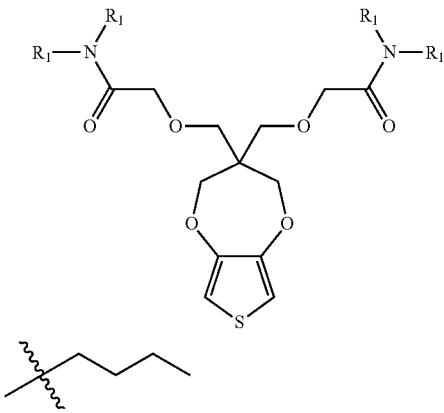

One of the most widely studied electrochromic polymer, ECP-Magenta, comprising the formula:

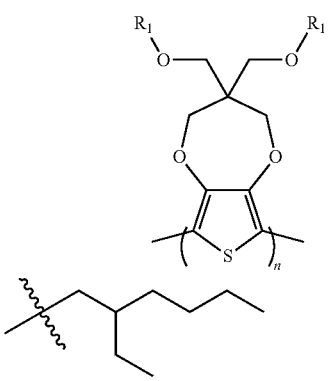

ProDOT-(CH$_2$OEtHx)$_2$
ECP-Magenta wherein n is an integer greater than 0.

In some illustrative embodiments, the present invention relates to a compound comprising the formula:

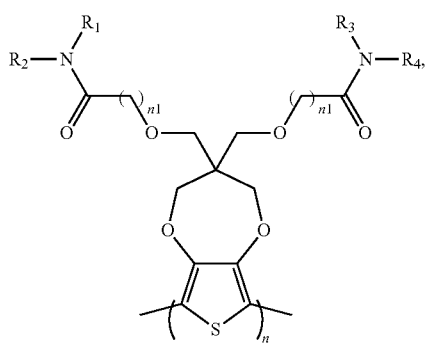

wherein each of $R_1$, $R_2$, $R_3$, and $R_4$ is, but not limited to, independently hydrogen, $C_1$-$C_{30}$ alkyl, $C_2$-$C_{30}$ alkenyl, $C_2$-$C_{30}$ alkynyl, $C_2$-$C_{30}$ alkylcarbonyl, $C_1$-$C_{30}$ alkoxy, $C_3$-$C_{30}$ alkoxyalkyl, $C_2$-$C_{30}$ alkoxycarbonyl, $C_4$-$C_{30}$ alkoxycarbonylalkyl, $C_1$-$C_{30}$ aminylcarbonyl, $C_4$-$C_{30}$ aminylalkyl, $C_1$-$C_{30}$ alkylaminyl, $C_1$-$C_{30}$alkylsulfonyl, $C_3$-$C_{30}$ alkylsulfonylalkyl, $C_6$-$C_{18}$ aryl, $C_3$-$C_{15}$ cycloalkyl, $C_3$-$C_{30}$ cycloalkylaminyl, $C_5$-$C_{30}$ cycloalkylalkylaminyl, $C_5$-$C_{30}$cycloalkylalkyl, $C_5$-$C_{30}$ cycloalkylalkyloxy, $C_1$-$C_{12}$ heterocyclyl, $C_1$-$C_{12}$ heterocyclyloxy, $C_3$-$C_{30}$ heterocyclylalkyloxy, $C_1$-$C_{30}$heterocyclylalkyloxy, $C_1$-$C_{30}$ heterocyclylaminyl, $C_5$-$C_{30}$heterocyclylalkylaminyl, $C_2$-$C_{12}$ heterocyclylcarbonyl, $C_3$-$C_{30}$heterocyclylalkyl, $C_1$-$C_{13}$ heteroaryl, or $C_3$-$C_{30}$ heteroarylalkyl; n and n1 are integers greater than 0.

In some illustrative embodiments, the present invention relates to a compound comprising the formula:

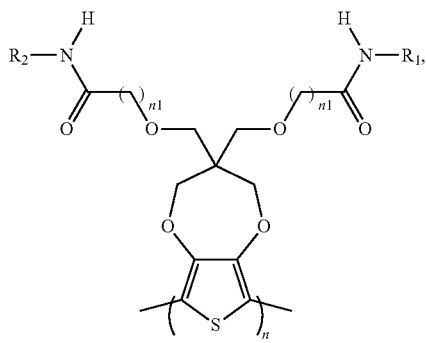

wherein each of R1, R2 is, but not limited to, independently C1-C30 alkyl, C2-C30 alkenyl, C2-C30 alkynyl, C2-C30 alkylcarbonyl, C1-C30 alkoxy, C3-C30 alkoxyalkyl, C2-C30 alkoxycarbonyl, C4-C30 alkoxycarbonylalkyl, C1-C30 aminylcarbonyl, C4-C30 aminylalkyl, C1-C30 alkylaminyl, C1-C30alkylsulfonyl, C3-C30 alkylsulfonylalkyl, C6-C18 aryl, C3-C15 cycloalkyl, C3-C30 cycloalkylaminyl, C5-C30 cycloalkylalkylaminyl, C5-C30cycloalkylalkyl, C5-C30 cycloalkylalkyloxy, C1-C12 heterocyclyl, C1-C12heterocyclyloxy, C3-C30 heterocyclylalkyloxy, C1-C30heterocyclylalkyloxy, C1-C30 heterocyclylaminyl, C5-C30heterocyclylalkylaminyl, C2-C12 heterocyclylcarbonyl, C3-C30heterocyclylalkyl, C1-C13 heteroaryl, or C3-C30 heteroarylalkyl; n and n1 are integers greater than 0.

In some illustrative embodiments, the present invention relates to a compound comprising the formula:

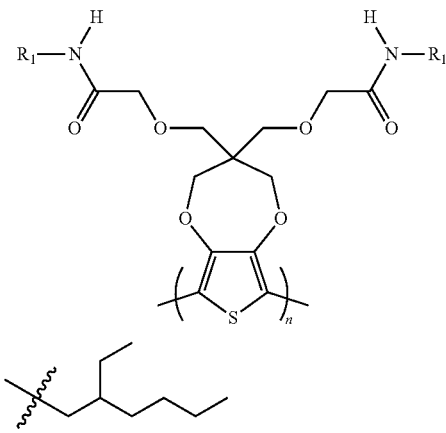

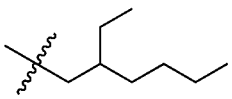

wherein n is an integer greater than 0.

In some illustrative embodiments, the present invention relates to a compound comprising the formula:

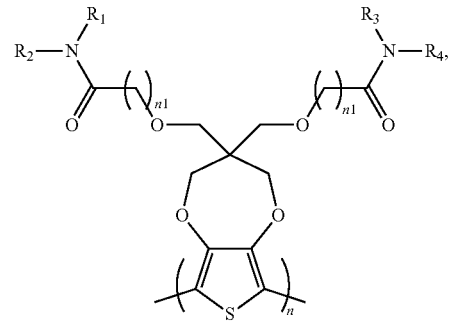

wherein each of R1, R2, R3, and R4 is, but not limited to, independently C1-C30 alkyl, C2-C30 alkenyl, C2-C30 alkynyl, C2-C30 alkylcarbonyl, C1-C30 alkoxy, C3-C30 alkoxyalkyl, C2-C30 alkoxycarbonyl, C4-C30 alkoxycarbonylalkyl, C1-C30 aminylcarbonyl, C4-C30 aminylalkyl, C1-C30 alkylaminyl, C1-C30alkylsulfonyl, C3-C30 alkylsulfonylalkyl, C6-C18 aryl, C3-C15 cycloalkyl, C3-C30 cycloalkylaminyl, C5-C30 cycloalkylalkylaminyl, C5-C30cycloalkylalkyl, C5-C30 cycloalkylalkyloxy, C1-C12 heterocyclyl, C1-C12heterocyclyloxy, C3-C30 heterocyclylalkyloxy, C1-C30heterocyclylalkyloxy, C1-C30 heterocyclylaminyl, C5-C30heterocyclylalkylaminyl, C2-C12 heterocyclylcarbonyl, C3-C30heterocyclylalkyl, C1-C13 heteroaryl, or C3-C30 heteroarylalkyl; n and n1 are integers greater than 0.

In some illustrative embodiments, the present invention relates to a compound comprising the formula:

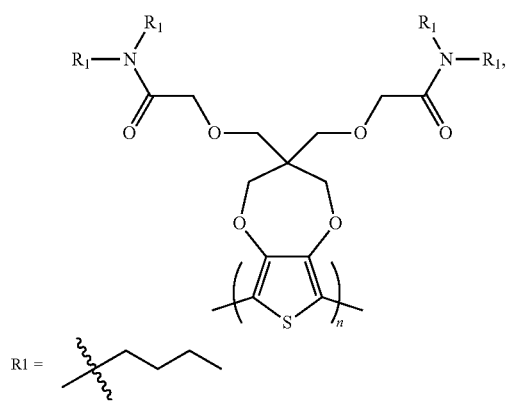

wherein n is an integer greater than 0.

In some illustrative embodiments, the present invention relates to a compound comprising the formula:

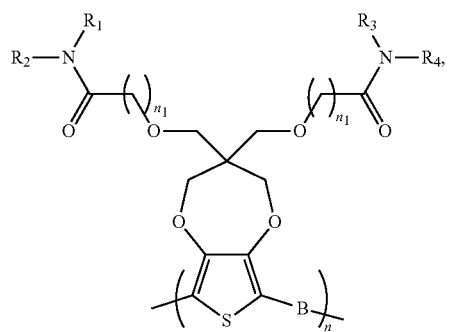

wherein each of $R_1$, $R_2$, $R_3$, and $R_4$ is, but not limited to, independently hydrogen, $C_1$-$C_{30}$ alkyl, $C_2$-$C_{30}$ alkenyl, $C_2$-$C_{30}$ alkynyl, $C_2$-$C_{30}$ alkylcarbonyl, $C_1$-$C_{30}$ alkoxy, $C_3$-$C_{30}$ alkoxyalkyl, $C_2$-$C_{30}$ alkoxycarbonyl, $C_4$-$C_{30}$ alkoxycarbonylalkyl, $C_1$-$C_{30}$ aminylcarbonyl, $C_4$-$C_{30}$ aminylalkyl, $C_1$-$C_{30}$ alkylaminyl, $C_1$-$C_{30}$alkylsulfonyl, $C_3$-$C_{30}$ alkylsulfonylalkyl, $C_6$-$C_{18}$ aryl, $C_3$-$C_{15}$ cycloalkyl, $C_3$-$C_{30}$ cycloalkylaminyl, $C_5$-$C_{30}$ cycloalkylalkylaminyl, $C_5$-$C_{30}$cycloalkylalkyl, $C_5$-$C_{30}$cycloalkylalkyloxy, $C_1$-$C_{12}$ heterocyclyl, $C_1$-$C_{12}$heterocyclyloxy, $C_3$-$C_{30}$ heterocyclylalkyloxy, $C_1$-$C_{30}$heterocyclylalkyloxy, $C_1$-$C_{30}$ heterocyclylaminyl, $C_1$-$C_{30}$heterocyclylalkylaminyl, $C_2$-$C_{12}$ heterocyclylcarbonyl, $C_3$-$C_{30}$heterocyclylalkyl, $C_1$-$C_{13}$ heteroaryl, or $C_3$-$C_{30}$ heteroarylalkyl; n and n1 are integers greater than 0;

and B is selected from the group including, but not limited to:

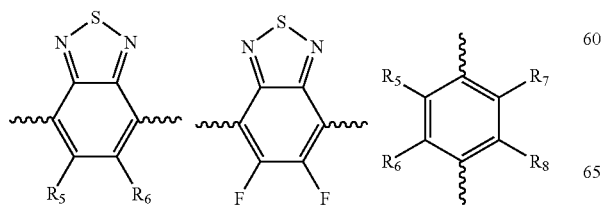

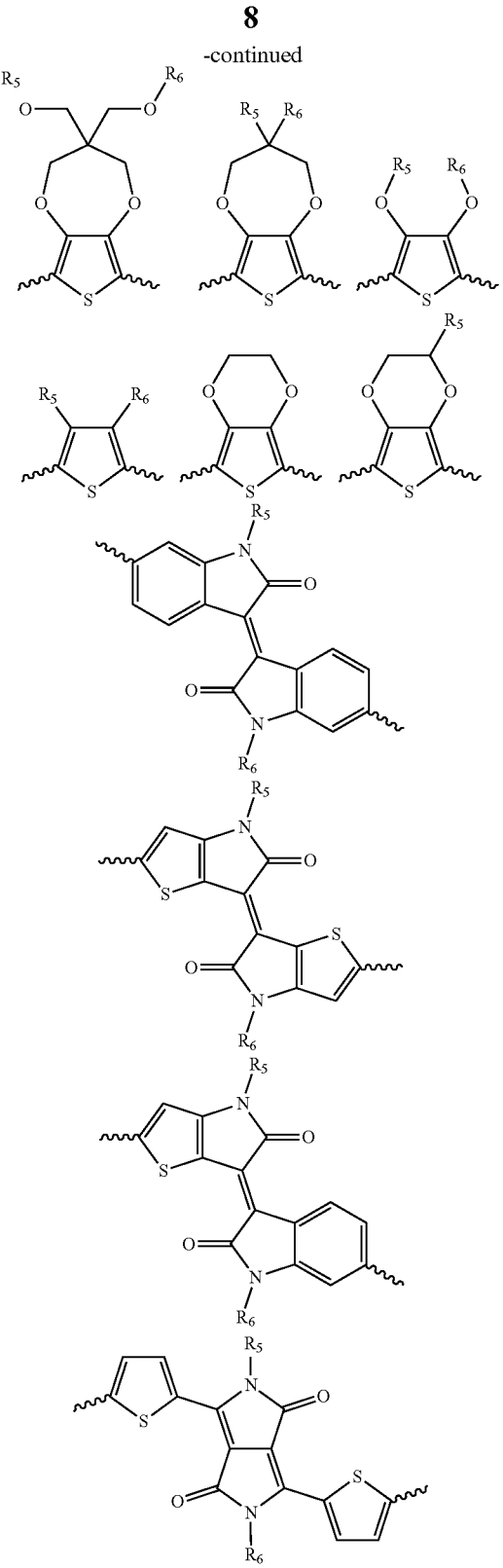

wherein the wave line ⁓⁓⁓ represent the connecting points of the polymer unit, and each of $R_5$, $R_6$, $R_7$, and $R_8$ is independently selected from a group including: hydrogen, $C_1$-$C_{30}$ alkyl, $C_2$-$C_{30}$ alkenyl, $C_2$-$C_{30}$ alkynyl, $C_2$-$C_{30}$ alkylcarbonyl, $C_1$-$C_{30}$ alkoxy, $C_3$-$C_{30}$ alkoxyalkyl, $C_2$-$C_{30}$ alkoxycarbonyl, $C_4$-$C_{30}$ alkoxycarbonylalkyl, $C_1$-$C_{30}$ aminylcarbonyl, $C_4$-$C_{30}$ aminylalkyl, $C_1$-$C_{30}$ alkylaminyl, $C_1$-$C_{30}$alkylsulfonyl, $C_3$-$C_{30}$ alkylsulfonylalkyl, $C_6$-$C_{18}$ aryl, $C_3$-$C_{15}$ cycloalkyl, $C_3$-$C_{30}$ cycloalkylaminyl, $C_5$-$C_{30}$ cycloalkylalkylaminyl, $C_5$-$C_{30}$cycloalkylalkyl, $C_5$-$C_{30}$ cycloalkylalkyloxy, $C_1$-$C_{12}$ heterocyclyl, $C_1$-$C_{12}$heterocyclyloxy, $C_3$-$C_{30}$ heterocyclylalkyloxy, $C_1$-$C_{30}$heterocyclylalkyloxy, $C_1$-$C_{30}$ heterocyclylaminyl, $C_1$-$C_{30}$heterocyclylalkylaminyl, $C_2$-$C_{12}$ heterocyclylcarbonyl, $C_3$-$C_{30}$heterocyclylalkyl, $C_1$-$C_{13}$ heteroaryl, or $C_3$-$C_{30}$ heteroarylalkyl; and wherein B is incorporated into the polymer using a compound selected from the group comprising of, but not limited to:

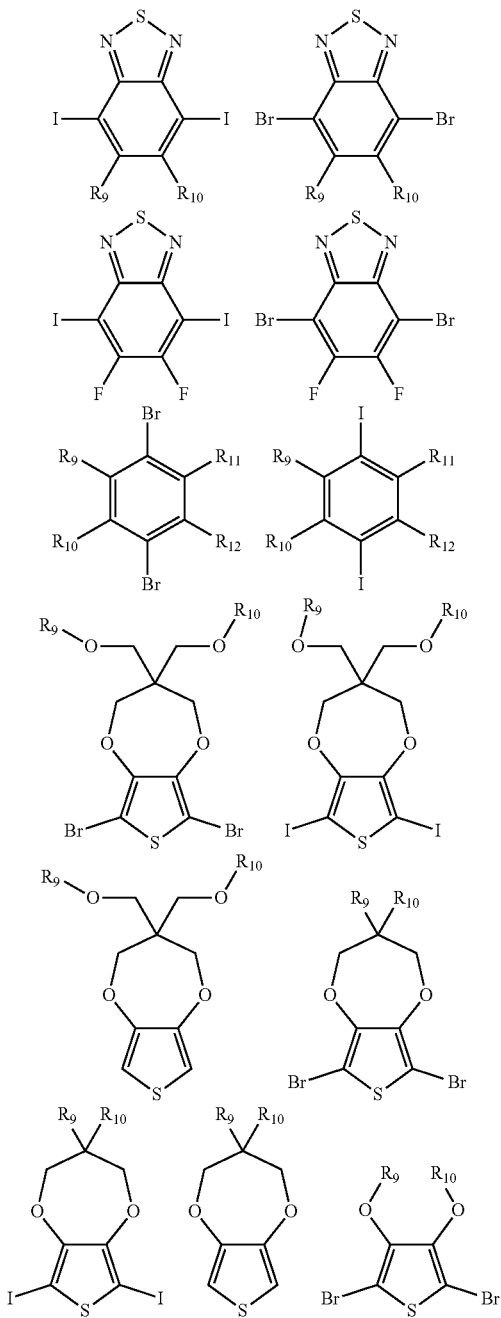
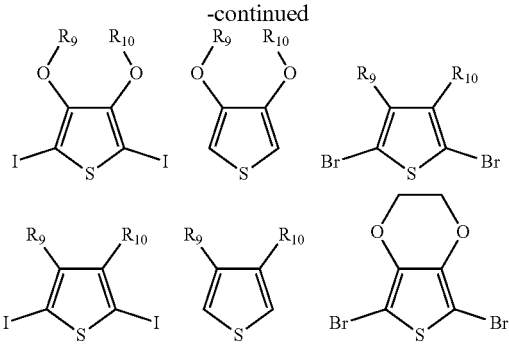
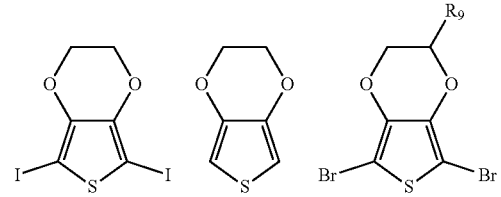
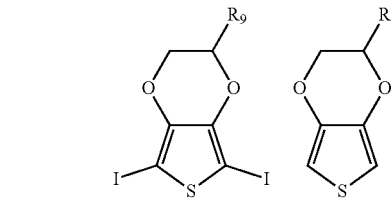
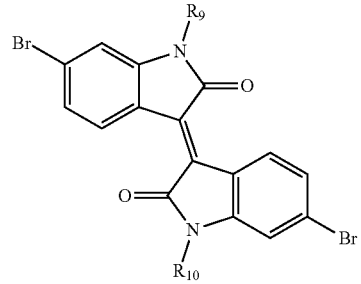
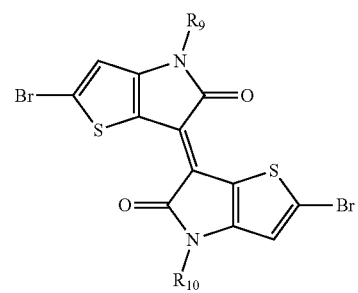
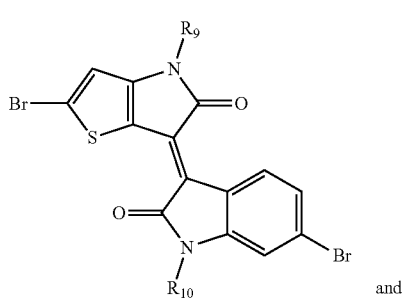

and

-continued

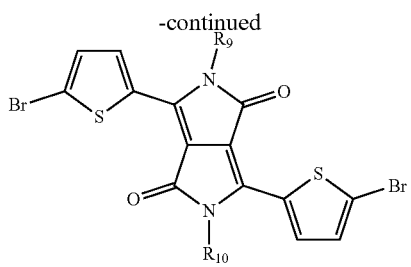

wherein each of $R_9$, $R_{10}$, $R_{11}$, and $R_{12}$ is independently selected from a group including, but not limited to, hydrogen, $C_1$-$C_{30}$ alkyl, $C_2$-$C_{30}$ alkenyl, $C_2$-$C_{30}$ alkynyl, $C_2$-$C_{30}$ alkylcarbonyl, $C_1$-$C_{30}$ alkoxy, $C_3$-$C_{30}$ alkoxyalkyl, $C_2$-$C_{30}$ alkoxycarbonyl, $C_4$-$C_{30}$ alkoxycarbonylalkyl, $C_1$-$C_{30}$ aminylcarbonyl, $C_4$-$C_{30}$ aminylalkyl, $C_1$-$C_{30}$ alkylaminyl, $C_1$-$C_{30}$alkylsulfonyl, $C_3$-$C_{30}$ alkylsulfonylalkyl, $C_6$-$C_{18}$ aryl, $C_3$-$C_{15}$ cycloalkyl, $C_3$-$C_{30}$ cycloalkylaminyl, $C_5$-$C_{30}$ cycloalkylalkylaminyl, $C_1$-$C_{30}$cycloalkylalkyl, $C_5$-$C_{30}$ cycloalkylalkyloxy, $C_1$-$C_{12}$ heterocyclyl, $C_1$-$C_{12}$heterocyclyloxy, $C_3$-$C_{30}$ heterocyclylalkyloxy, $C_1$-$C_{30}$heterocyclylalkyloxy, $C_1$-$C_{30}$heterocyclylaminyl, $C_5$-$C_{30}$heterocyclylalkylaminyl, $C_2$-$C_{12}$ heterocyclylcarbonyl, $C_3$-$C_{30}$heterocyclylalkyl, $C_1$-$C_{13}$ heteroaryl, or $C_3$-$C_{30}$ heteroarylalkyl.

In some illustrative embodiments, the present invention relates to a device or a machine incorporated the compound as disclosed herein.

In some illustrative embodiments, the present invention relates to a process to manufacture the compound as disclosed herein.

As used herein, the following terms and phrases shall have the meanings set forth below. Unless defined otherwise, all technical and scientific terms used herein have the same meaning as commonly understood to one of ordinary skill in the art.

In the present disclosure the term "about" can allow for a degree of variability in a value or range, for example, within 10%, within 5%, or within 1% of a stated value or of a stated limit of a range. In the present disclosure the term "substantially" can allow for a degree of variability in a value or range, for example, within 90%, within 95%, 99%, 99.5%, 99.9%, 99.99%, or at least about 99.999% or more of a stated value or of a stated limit of a range.

In this document, the terms "a," "an," or "the" are used to include one or more than one unless the context clearly dictates otherwise. The term "or" is used to refer to a nonexclusive "or" unless otherwise indicated. In addition, it is to be understood that the phraseology or terminology employed herein, and not otherwise defined, is for the purpose of description only and not of limitation. Any use of section headings is intended to aid reading of the document and is not to be interpreted as limiting. Further, information that is relevant to a section heading may occur within or outside of that particular section. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

The term "substituted" as used herein refers to a functional group in which one or more hydrogen atoms contained therein are replaced by one or more non-hydrogen atoms. The term "functional group" or "substituent" as used herein refers to a group that can be or is substituted onto a molecule. Examples of substituents or functional groups include, but are not limited to, a halogen (e.g., F, Cl, Br, and I); an oxygen atom in groups such as hydroxyl groups, alkoxy groups, aryloxy groups, aralkyloxy groups, oxo (carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, azides, hydroxylamines, cyano, nitro groups, N-oxides, hydrazides, and enamines; and other heteroatoms in various other groups.

The term "optionally substituted," or "optional substituents," as used herein, means that the groups in question are either unsubstituted or substituted with one or more of the substituents specified. When the groups in question are substituted with more than one substituent, the substituents may be the same or different. When using the terms "independently," "independently are," and "independently selected from" mean that the groups in question may be the same or different. Certain of the herein defined terms may occur more than once in the structure, and upon such occurrence each term shall be defined independently of the other.

The compounds described herein may contain one or more chiral centers, or may otherwise be capable of existing as multiple stereoisomers. It is to be understood that in one embodiment, the invention described herein is not limited to any particular stereochemical requirement, and that the compounds, and compositions, methods, uses, and medicaments that include them may be optically pure, or may be any of a variety of stereoisomeric mixtures, including racemic and other mixtures of enantiomers, other mixtures of diastereomers, and the like. It is also to be understood that such mixtures of stereoisomers may include a single stereochemical configuration at one or more chiral centers, while including mixtures of stereochemical configuration at one or more other chiral centers.

Similarly, the compounds described herein may include geometric centers, such as cis, trans, E, and Z double bonds. It is to be understood that in another embodiment, the invention described herein is not limited to any particular geometric isomer requirement, and that the compounds, and compositions, methods, uses, and medicaments that include them may be pure, or may be any of a variety of geometric isomer mixtures. It is also to be understood that such mixtures of geometric isomers may include a single configuration at one or more double bonds, while including mixtures of geometry at one or more other double bonds.

Further, in each of the foregoing and following embodiments, it is to be understood that the formulae include and represent not only all pharmaceutically acceptable salts of the compounds, but also include any and all hydrates and/or solvates of the compound formulae or salts thereof. It is to be appreciated that certain functional groups, such as the hydroxy, amino, and like groups form complexes and/or coordination compounds with water and/or various solvents, in the various physical forms of the compounds. Accordingly, the above formulae are to be understood to include and represent those various hydrates and/or solvates. In each of the foregoing and following embodiments, it is also to be understood that the formulae include and represent each possible isomer, such as stereoisomers and geometric isomers, both individually and in any and all possible mixtures. In each of the foregoing and following embodiments, it is also to be understood that the formulae include and represent any and all crystalline forms, partially crystalline forms, and non-crystalline and/or amorphous forms of the compounds.

In this present invention, amide-containing side chains are introduced to electrochromic polymer, thus introduced aqueous electrolyte compatibility to the electrochromic polymer. In some embodiments, an amide functional group per side chain is introduced to the widely studied electrochromic polymer, ECP-Magenta, which only contains an ether functionality (ProDOT-($CH_2OETHx$)$_2$) (P1). The redox and electrochromic properties of mono and di-substituted amide containing ProDOT polymers; ProDOT-N(H)EtHx (P2) and ProDOT-N(Butyl)$_2$ (P3) polymers show excellent electrochromic performance and stability similar to the widely-studied ProDOT polymer ECP-Magenta (ProDOT-EtHx, P1) in the presence of organic electrolytes but have the added advantage of having a lower oxidation making them potential candidates for more stable ECDs (Electrochromic Devices) with a longer lifetime. Unlike ECP-Magenta, these polymers also show redox activity in aqueous electrolytes. Out of the two amide polymers, ProDOT-N(Butyl)$_2$ shows reversible electrochromic switching in aqueous ammonium chloride electrolytes with a contrast approaching 70%, and a fast bleaching time and stable switching for up to 100 cycles with minimum degradation in a three-electrode setup. As such we have been able to identify that the addition of a single amide group per polymer side chain is capable of inducing aqueous electrolyte compatibility in ProDOT electrochromic polymers, a feat unattainable by ether and ester functionalities. Since the synthesized polymers are active in both aqueous and organic electrolytes we looked into how different anions and cations and their solvation impact the redox activity of the amide-containing polymers in an effort to understand the underlying mechanisms governing activity in aqueous environments. It has been shown that the type of anion has a major impact on the oxidation onset of ProDOT polymers with less solvated anions promoting facile oxidation of the polymer.

Scheme 1 shows the general synthetic route to prepare amide-containing ProDOT polymers (compound 4). The respective monomers are prepared starting from ProDOT-OH (1) with methods disclosed hereinafter. The molecular weight is evaluated by gel permeation chromatography (GPC) using THF as the eluent.

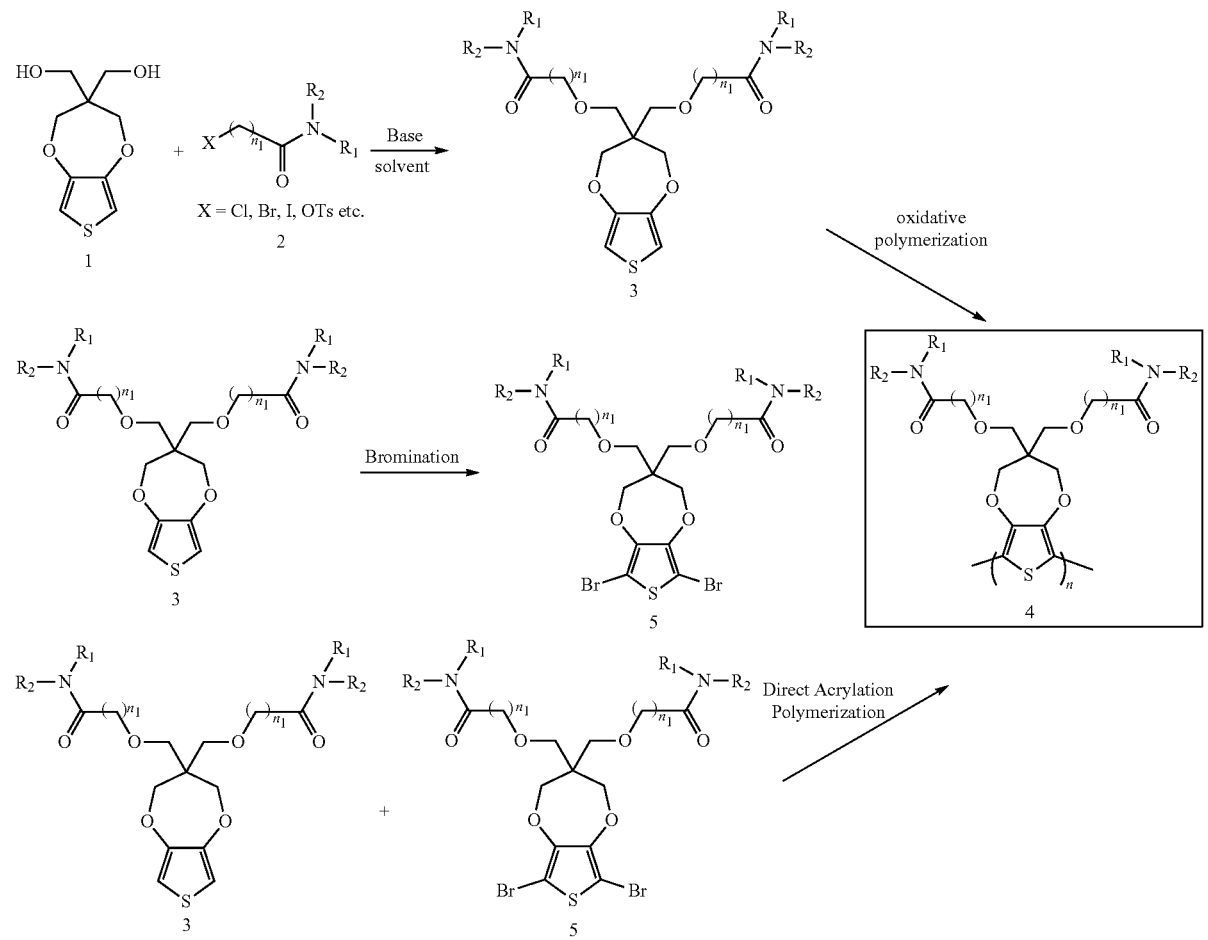

Scheme 1 General strategy for the synthesis of amide side chain polymers. Herein, OTs stands for p-toluenesulfonate.

In scheme 1, the Base includes, but not limited to, NaH, KH, nBuLi, tBuONa, tBuOK, $K_2CO_3$, $Cs_2CO_3$, Methyl magnesium bromide and all other Grignard reagent and base contained alkali metals. Solvent includes, but not limited to, chloroform, dichloromethane, nitromethane, acetonitrile, toluene, and other aprotic solvents. The oxidative polymerization includes, but not limited to, all Iron(III) salt and all organic peroxides and Inorganic peroxides. Direct Arylation Polymerization also can be used for the polymer synthesis. The Direct Arylation Polymerization(DArP) condition: compounds 3, and 5 are mixed in the presence of a palladium catalyst, a ligand, a base, and a solvent, under heat to form compound 4. The palladium catalyst in DArP may be selected from one or more of the following compounds: a palladium(II) catalyst, a palladium(0) catalyst, palladium acetate, bis(triphenylphosphine) palladium(II) dichloride, tetrakis(triphenylphosphine) palladium(0), tris(dibenzylideneacetone) dipalladium(0), or palladium chloride. The ligand employed in DArP may be selected from one or more of the following compounds: pivalic acid, benzoic acid, 2,2-dimethylhexanoic acid, 2,2-dimethyl-heptanoic acid, 2,2-dimethyloctanoic acid, or other organic acids without alpha hydrogen. The base for DArP may be selected from one or more of the following compounds: sodium carbonate, potassium carbonate, cesium carbonate, or other bases contain alkali metals. The solvent in DArP may be selected from one or more of the following compounds: dimethylformamide, dimethylacetamide, N-methyl-2-pyrrolidone, tetrahydrofuran, 2-methyltetrahydrofuran, toluene, dimethylbenzene, and other polar aprotic solvents.

An example synthesis is shown in Scheme 2.

Scheme 2 Example synthesis scheme of amide side chain polymers based on oxidative polymerization.

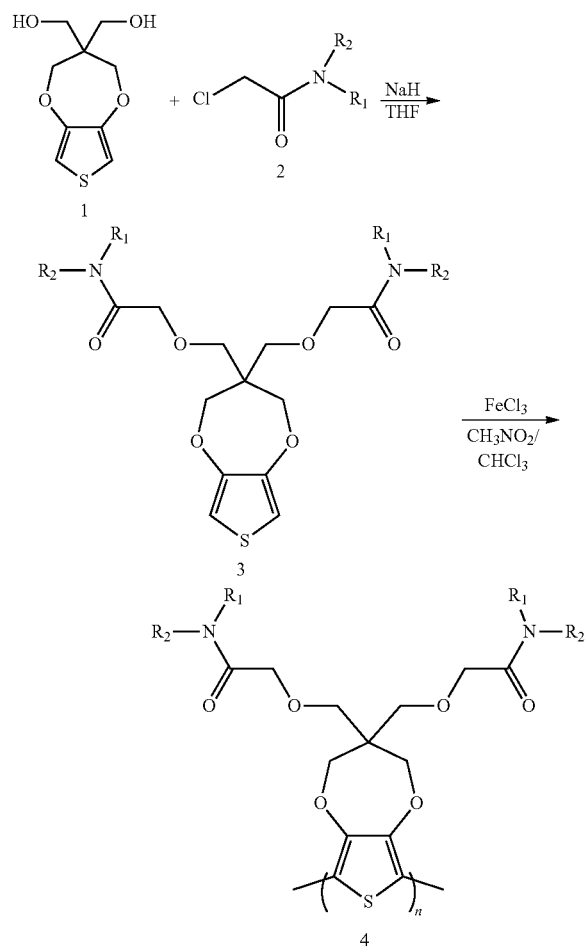

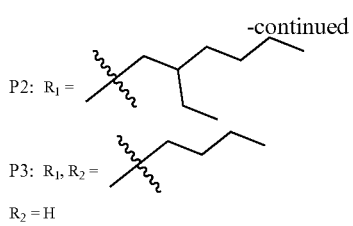

An example procedure to synthesize monomer (compound 3 in scheme 2) is provided herein. To a suspension of NaH (0.27 g, 6.7 mmol, 60% dispersion in mineral oil) in THF (50 mL) is added compound 1 (0.41 g, 1.9 mmol) at 0° C. After the above is stirred at 0° C. for 1 hour, compound 2 (1.0 g, 5.0 mmol) is added therein and the mixture is stirred at room temperature for 12 hours. Then the reaction solution is poured into saturated aqueous $NH_4Cl$ and extracted with ethyl acetate. The combined organic phase is dried over $MgSO_4$, concentrated in vacuo, and finally purified by flash column chromatography on silica gel (EtOAc) to afford a colorless oil (0.85 g, 81%). When subject to a nuclear magnetic resonance (NMR) spectroscopy under the following examination conditions: $^1H$ NMR (300 MHz, $CDCl_3$, $\delta$ ppm), the chemical shift data ($\delta$) for P2 monomer are: 6.49 (s, 2H), 6.49 (b, 2H), 4.04 (s, 4H), 3.96 (s, 4H), 3.61 (s, 4H), 3.23 (t, 4H), 1.43 (m, 2H), 1.24-1.31 (m, 16H), 0.88 (m, 12H). When subject to an NMR spectroscopy under the following examination conditions: $^1H$ NMR (400 MHz, $CDCl_3$, $\delta$ ppm), the chemical shift data ($\delta$) for P3 monomer are: 6.44 (d, 2H), 4.15 (s, 4H), 4.10 (s, 4H), 3.69 (s, 4H), 3.26 (t, 4H), 3.12 (t, 4H), 1.46 (m, 8H), 1.26 (m, 8H), 0.88 (m, 12H).

An example procedure to synthesize polymer (compound 4 in scheme 2) is provided herein. To compound 3 (310 mg, 0.559 mmol) in chloroform (0.1 mol/L) is added dropwise a 1 mol/L solution of anhydrous $FeCl_3$ (453 mg, 2.79 mmol) in nitromethane. The mixture is stirred overnight at room temperature and subsequently poured into 200 mL of methanol. The precipitated solid is dissolved in 200 mL of chloroform to form a solution. The solution is stirred for 1 hour with 3 mL of hydrazine monohydrate. The solution is then washed with 1 mol/L HCl and concentrated by evaporation, and then dropped into methanol. The precipitated solid is subsequently purified via Soxhlet extraction with methanol, hexanes, and chloroform. The chloroform fraction is collected, concentrated by evaporation, and precipitated from methanol to afford a dark-purple solid.

Another example procedure to synthesize polymer compound 4 is provided in Scheme 3 below.

Scheme 3 Example synthesis scheme of amide side chain polymers based on direct arylation polymerization.

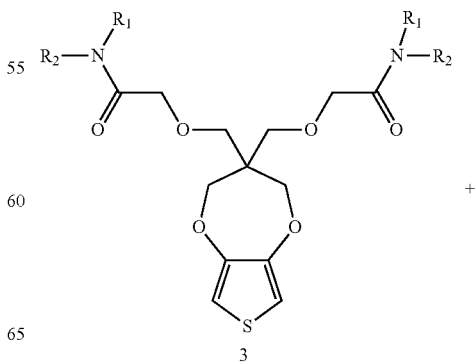

-continued

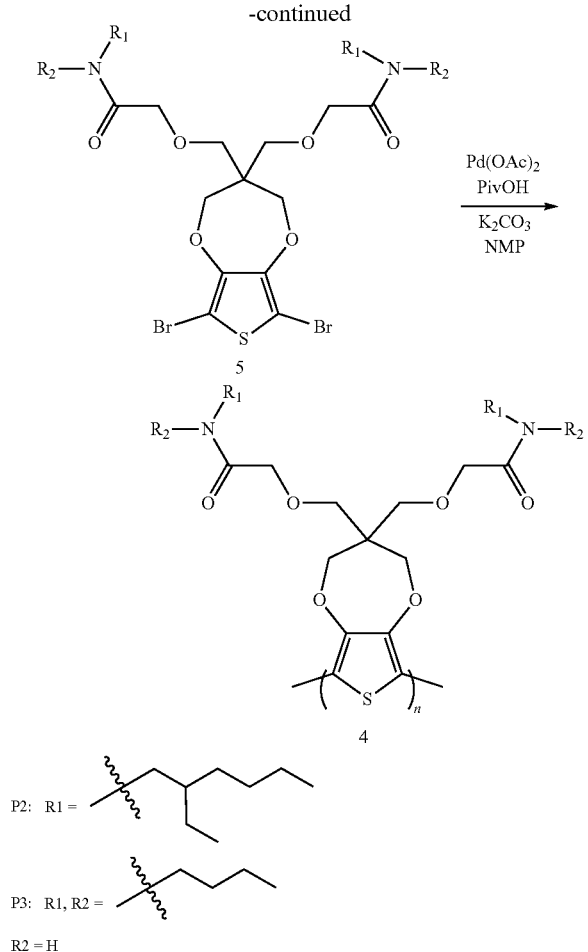

An example procedure to synthesize polymer (compound 4 in scheme 3) is provided herein. Add compound 3 (1 mmol), compound 5 (1 mmol), Pd(OAc)$_2$ (0.02 mmol), PivOH (0.3 mmol), K$_2$CO$_3$ (2.6 mmol) into a flask. Vacuum to remove air and refill back with nitrogen, and repeat this procedure for 3 times. Add degased N-Methyl pyrrolidone (NMP) 10 mL into the flask and heat to 140° C. for 20 hours. Then precipitate the reaction mixture into methanol and filter to get the solid. The precipitated solid is subsequently purified via Soxhlet extraction with methanol, hexanes, and chloroform. The chloroform fraction is collected, concentrated by evaporation, and precipitated from methanol to afford a dark-purple solid.

EXAMPLES

1. Side Chain Induced Morphological Changes in ProDOT Polymers (ProDOT-(EtHx)$_2$ (P1), ProDOT-N(H)EtHx (P2); and ProDOT-N(Butyl)$_2$ (P3)

Figure 1A:
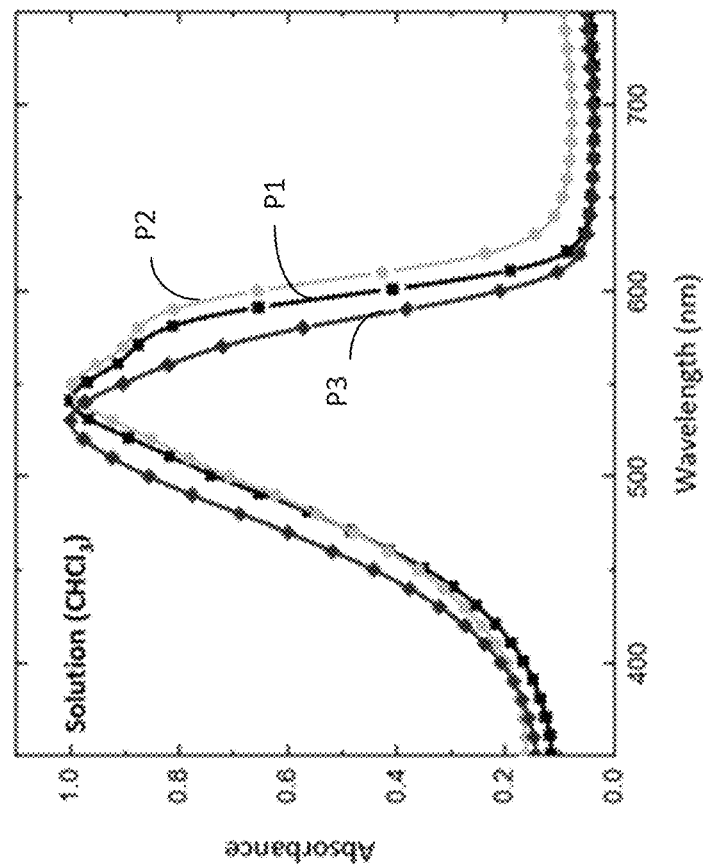
FIG. 1A is normalized absorption spectra of a solution (50 µg/mL in $CHCl_3$) of ProDOT polymers according to one example embodiment.

Inclusion of the mono and di-substituted amide side chains on the PProDOT backbone is found to bring changes in absorbance spectra for solution and especially thin film samples as shown in FIGS. 1A and 1B.

According to the solution-state absorbance spectra (FIG. 1A), mono-substituted amide containing PProDOT (P2) has a slightly red-shifted absorbance onset compared to P1 and P3. The di-substituted amide PProDOT (P3) remains completely amorphous in solution whereas the OEtHx and NH(EtHx) side chains appear to induce a preferred orientation (loose aggregation) in the solution state. When spin-coated onto thin films, the absorbance spectra (FIG. 1B) reveal that the amide side chains induce better conjugation with P2 exhibiting the most red-shifted absorbance (probably due to H-bonding that affords better packing). The 0-0/0-1 peak height ratios reveal that di-substituted amide side chains cause the polymer to adopt a more planar stacking compared to the mono-substituted version. The ProDOT polymers that show loose aggregation in solution (P1 and P2) retain this morphology even in the thin-film state.

2. Electrolyte Compatibility of ProDOT Polymers

Figure 2B:
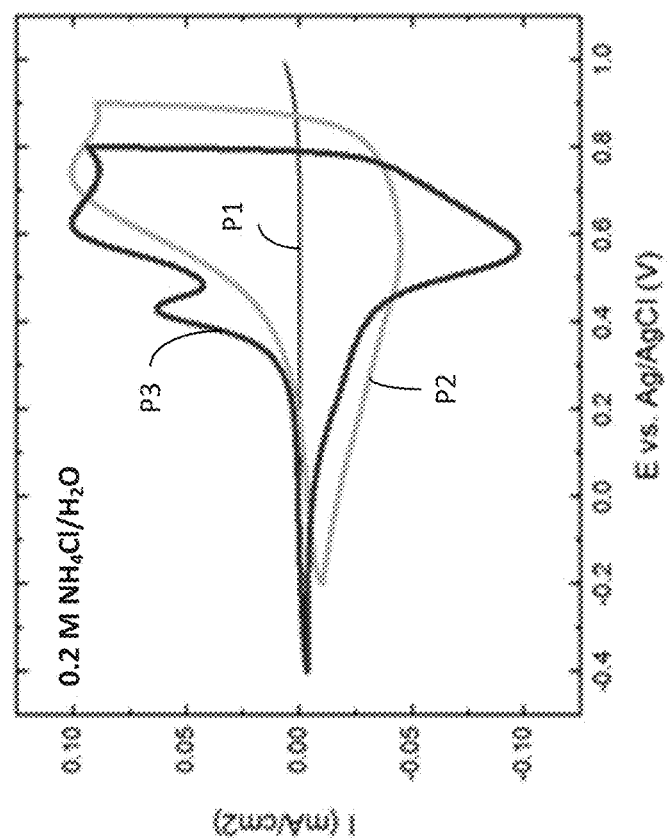
FIG. 2B is a diagram showing CV data of ProDOT polymers in 0.2 M $NH_4Cl$ in deionized water recorded at a scan rate of 40 mV $s^{-1}$, according to one example embodiment.
Figure 2A:
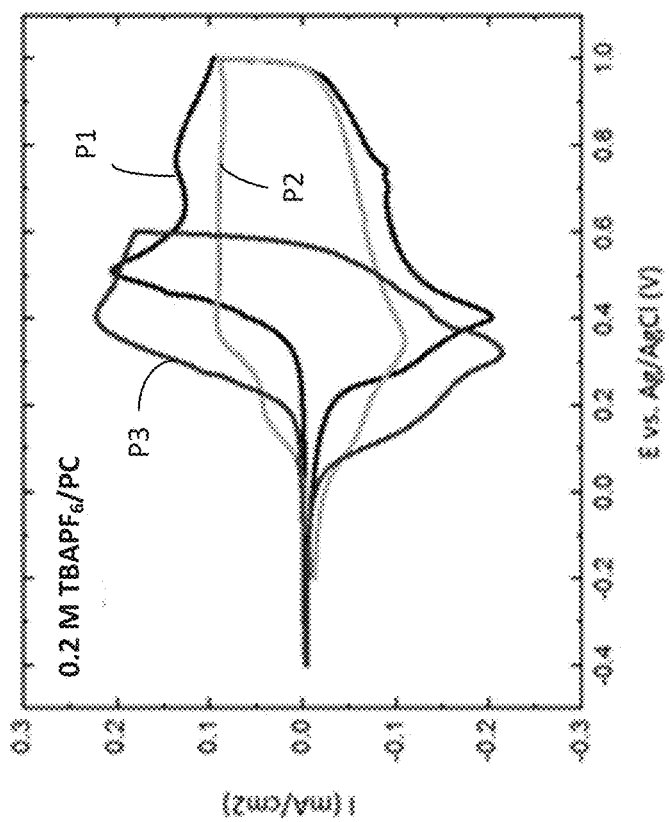
FIG. 2A is a diagram showing cyclic voltammetry (CV) data of ProDOT polymers in 0.2 M tetrabutylammonium hexafluorophosphate ($TBAPF_6$) in propylene carbonate recorded at a scan rate of 40 mV $s^{-1}$, according to one example embodiment.

Electroactivity of the three ProDOT based polymers (P1, P2, P3) in a commonly used organic electrolyte (0.2 M TBAPF$_6$/propylene carbonate) and an aqueous electrolyte (0.2 M NaCl/H$_2$O) are shown in FIGS. 2A and 2B. The two ProDOT-amide polymers (P2, P3) show excellent electrochemical stability in the organic electrolyte, tetrabutylammonium hexafluorophosphate in propylene carbonate, whereas P1 is coated on an octadecyltrichlorosilane (OTS)-modified electrode to obtain electrochemical stability (FIG. 2A). When considering the electroactivity of these three polymers in the organic electrolyte, it is clear that the amide side chain modification is capable of bringing in notable changes in terms of current density, oxidation onsets and oxidation peak positions, illustrating the importance of thin-film morphology in tuning electrochemical characteristics of conjugated polymers. As a general observation, both ProDOT-amide polymers have a lower oxidation onset compared to ECP-Magenta. This trend of observing a lowered oxidation onset upon inclusion of polar side chains has been previously observed in the case of triethyleneglycol (TEG) substituted and di-ester substituted ProDOT polymers. The rationale behind the lowered oxidation onset could be the enhanced π-π interactions of the polymer backbone caused by formation of distinct polar and non-polar domains, thereby increasing the effective conjugation length of the polymer backbone. The claim for increased conjugation is supported by the absorption spectra of the pristine thin films (FIG. 2B), where the absorption onsets of the ProDOT amides are red shifted by more than 20 nm compared to that of alkyl-substituted ProDOT. Accordingly, P2, which has the most red-shifted absorbance onset (≈50 nm with respect P1) shows the lowest oxidation onset of the three polymers. The facile oxidation is further supported by the spectroelectrochemical data of ProDOT polymer thin films where polaron formation is observed at 0.4 V, 0.1 V and 0.2 V for P1, P2 and P3 respectively. Although P3 has a slightly higher oxidation onset (FIG. 2A), both amide polymers transition from the polaron to the bipolaron state approximately around 0.35 V. Due to the enhanced current density of P3 at lower positive potentials, P3 completely transforms into the bipolaron state at a lower oxidation potential (+0.6 V). The improved current density could be a result of the high surface roughness of the P3 thin films, as observed from the AFM images of the pristine films, facilitating better accessibility for the electrolyte ions.

Figure 3A:
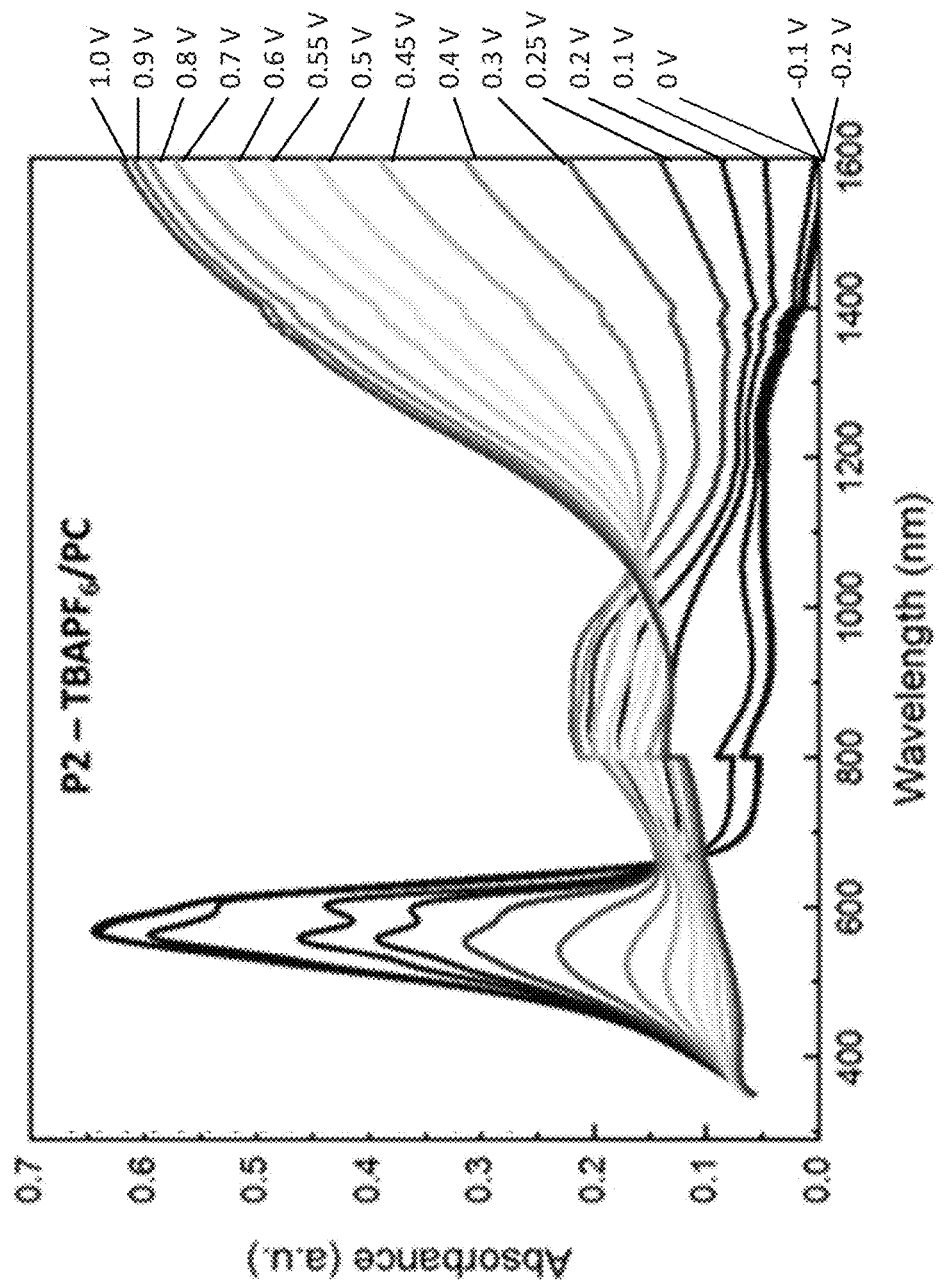
FIGS. 3A and 3B show spectroelectrochemical measurements of amide-containing ProDOT polymers P2 and P3 in 0.2 M $TBAPF_6$/PC, according to one example embodiment.
Figure 3B:
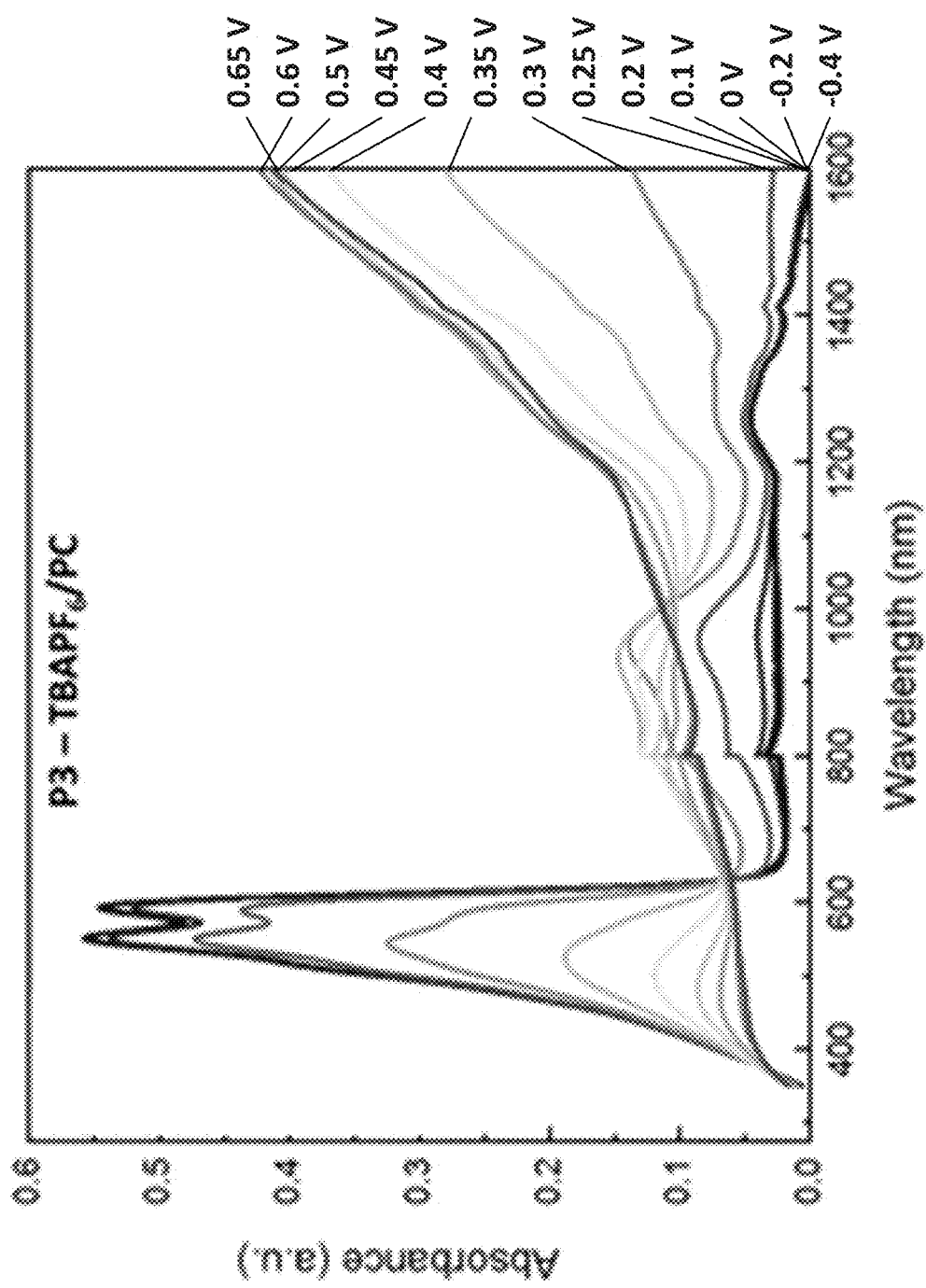
Figure 4A:
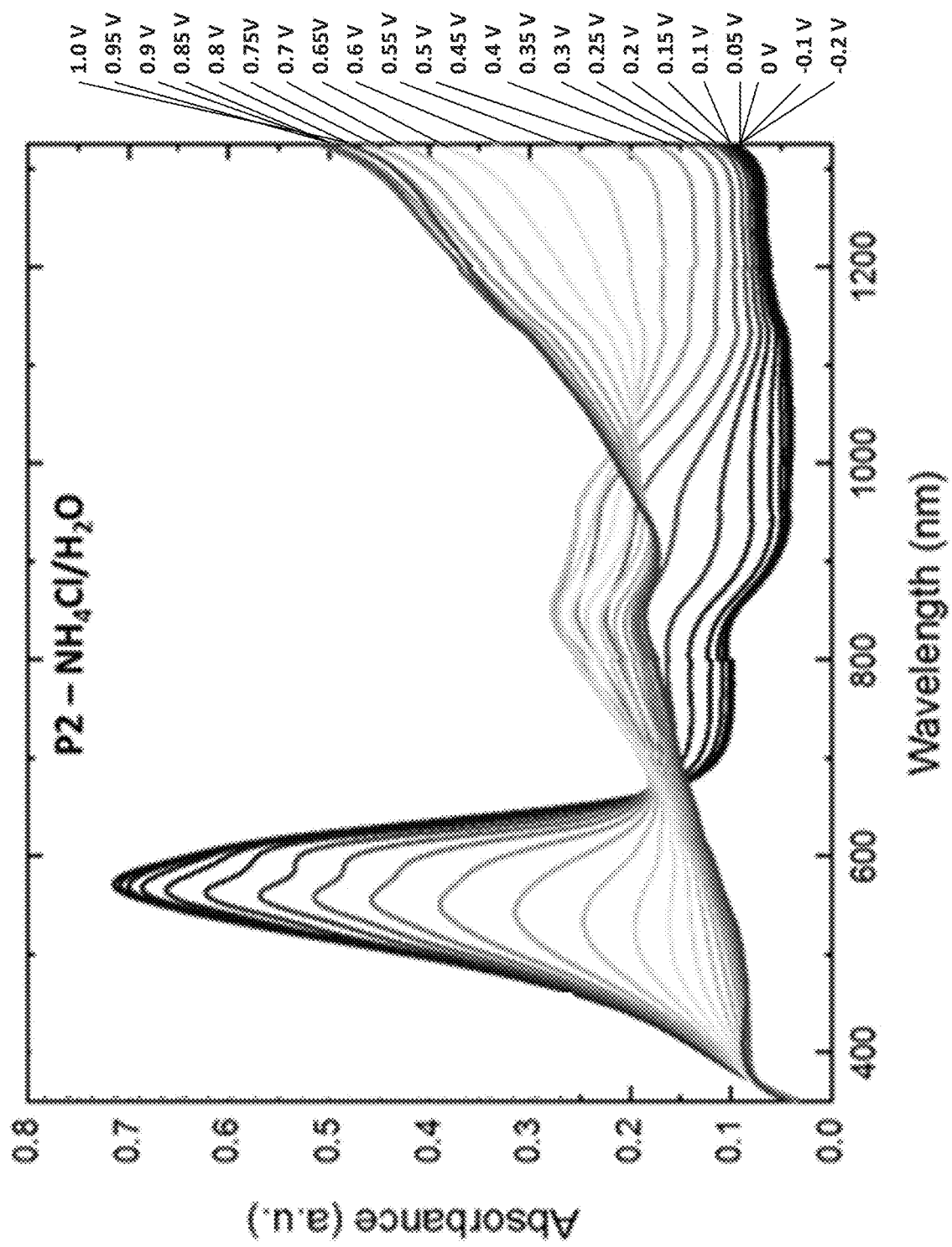
FIGS. 4A and 4B show spectroelectrochemical measurements of amide-containing ProDOT polymers P2 and P3 in 0.2 M $NH_4Cl/H_2O$, according to one example embodiment.
Figure 4B:
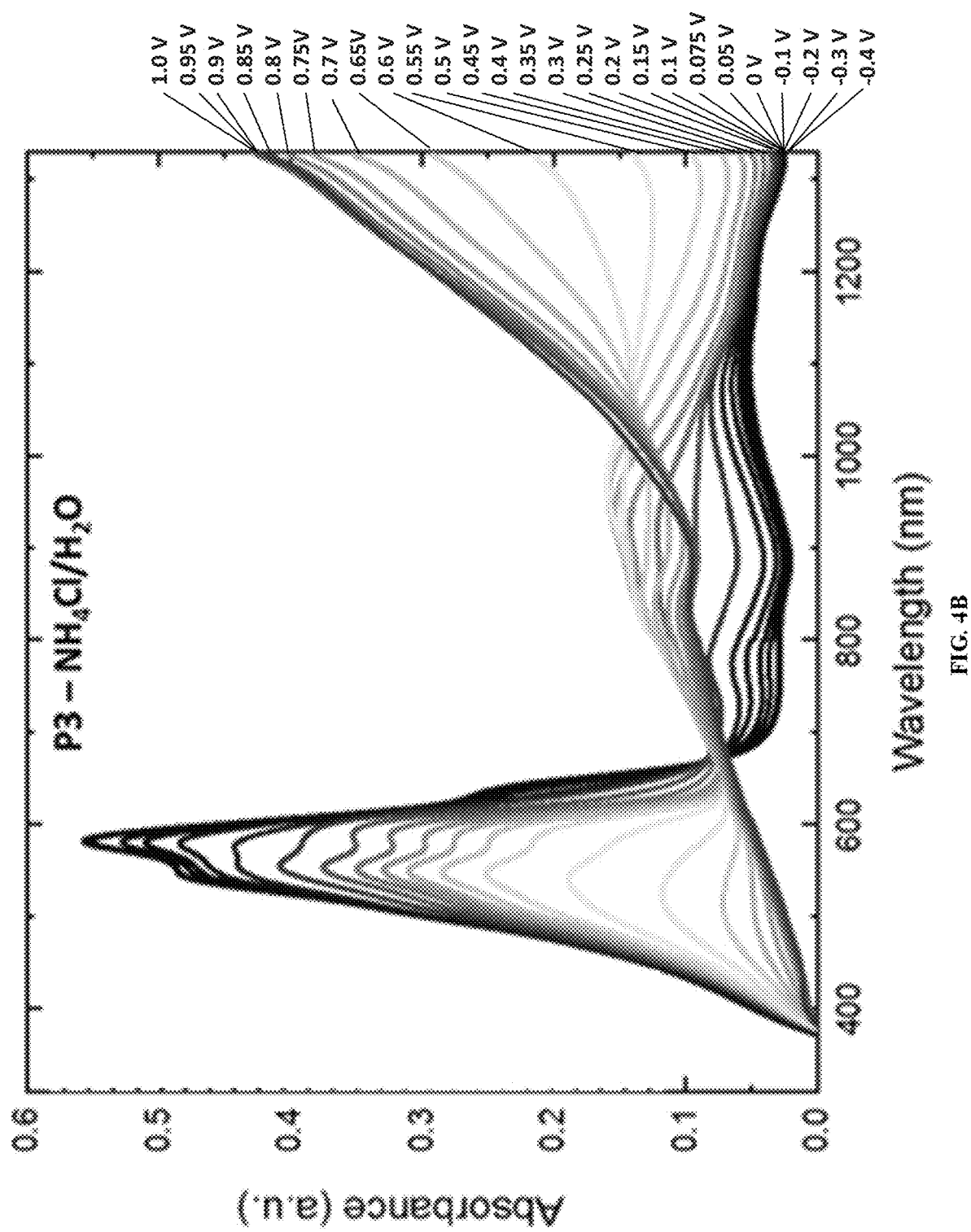

Inclusion of the amide functionality affords electrochemical cyclability in aqueous electrolytes (0.2 M NaCl) as shown in FIG. 2B. The unique feature of this approach is that the addition of a single amide group to the polymer side chain renders the ProDOT polymer aqueous electrolyte compatible, whereas previously reported approaches using polar functional groups such as ether and ester side chains require the use of two or more polar functionalities per side chain to achieve such electroactivity in water-based media. Additionally, the enhanced polarity of the reported side chains may cause the polymer films to dissolve in polar organic solvents, limiting their usability. The amide group incorporated into the polymer side chain facilitates cyclability in both organic and aqueous electrolytes, and can therefore be used as a versatile tool to improve the functionality of the ProDOT polymer with minimum impact on the characteristics of the main polymer. Considering the electrochemical data in FIG. 2B, ProDOT with hydrophobic side chains (P1) shows negligible electroactivity in aqueous $NH_4Cl$ when compared to the ProDOT amides. Both amide-based polymers show electroactivity in 0.2 M $NH_4Cl$ (aq), however with a lower current density than in the organic electrolyte. The mono and di-substituted amide PProDOTs show a low oxidation onset (0.2 V) with P3 exhibiting better reversibility (at a scan rate of 40 $mVs^{-1}$) than the mono-substituted ProDOT-amide, probably due to enhanced surface roughness facilitating better electrochemical access for the hydrated ions. P3 is subjected to 500 CV cycles in 0.2 M $NH_4CL/H_2O$ and it maintains its electrochemical reversibility with minimum decrease of current. Contrasting the spectroelectrochemical data of P2 and P3 in 0.2 M $NH_4Cl$ (FIGS. 4A and 4B) with that in 0.2 M $TBAPF_6$ (FIGS. 3A and 3B), it is clearly seen that the oxidation of the polymers are more gradual in aqueous media, with the polaron to bipolaron switch occurring at ≈0.5 V (0.15 V higher than in propylene carbonate). According to FIGS. 4A and 4B, the bleaching behavior of P2 and P3 appear identical (under the measurement conditions where a constant potential is applied when recording the spectra). However, at a 40 mV $s^{-1}$ scan rate as shown in FIG. 2B, there appears to be a kinetic limitations for the oxidation of the well-packed mono-substituted amide polymer P2.

3. Influence of Electrolyte Solvent and Ions on Redox Characteristics

Figure 5A:
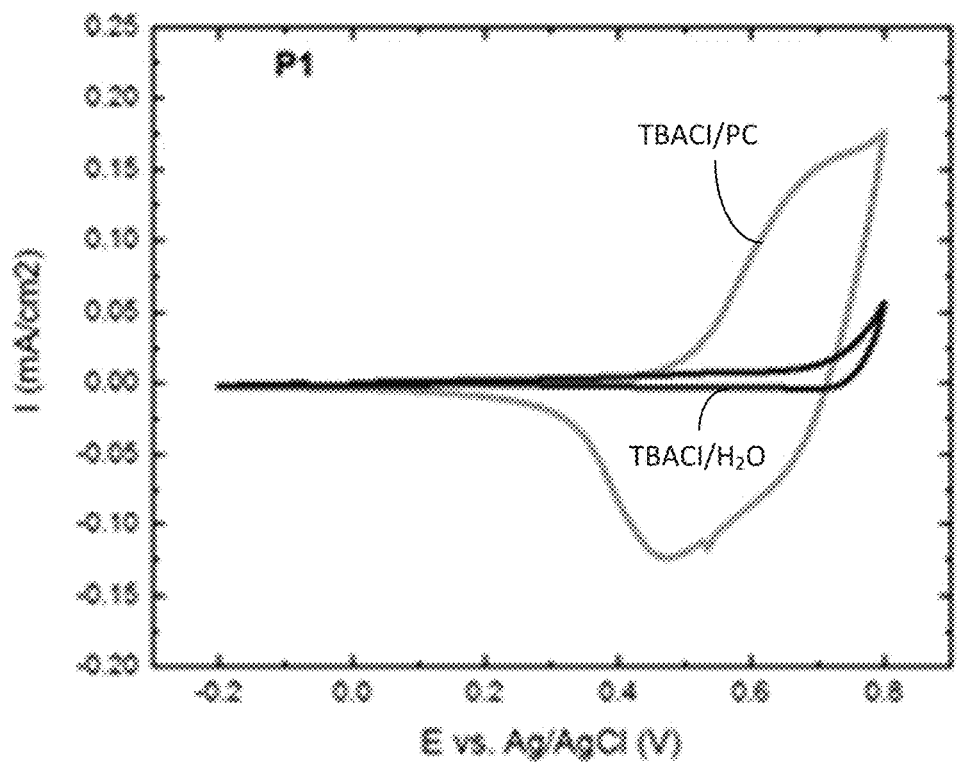
FIGS. 5A-5C illustrate cyclic voltammograms observed for polymers P1, P2 and P3 in 0.2 M TBACl electrolyte in organic and aqueous media recorded at 40 mV $s^{-1}$, according to one example embodiment.
Figure 5B:
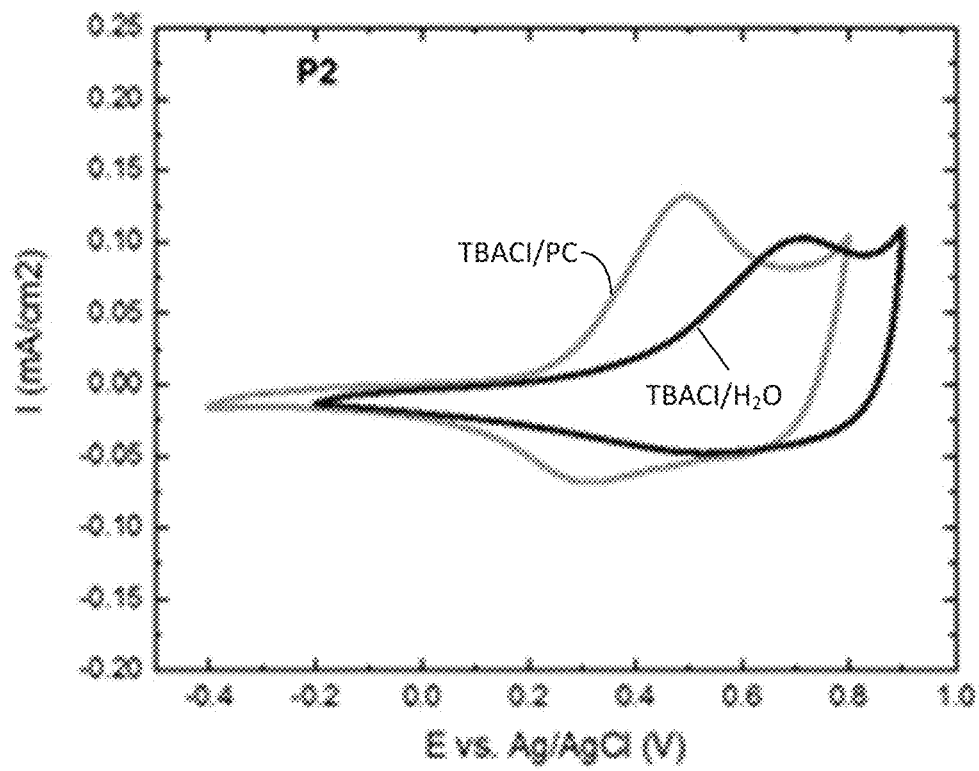
Figure 5C:
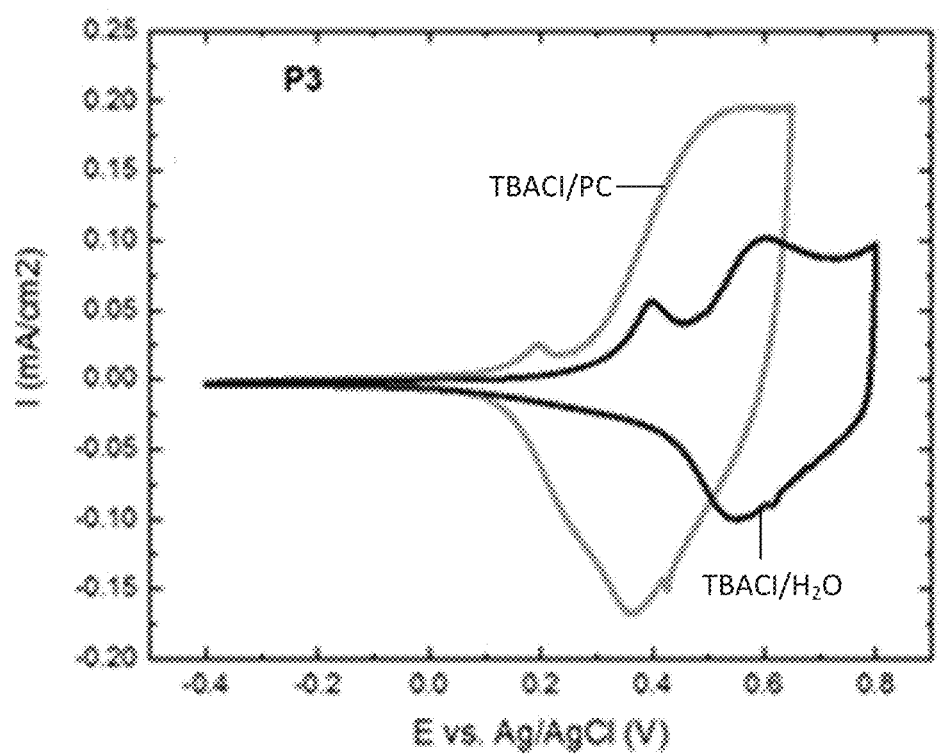

In order to understand the reasoning behind the differences in electroactivity of P1, P2 and P3 in organic vs aqueous electrolytes and the impact of ion solvation, electrochromic performance of the polymers is studied using tetrabutylammonium chloride (TBACl); a common salt that is soluble in both water and propylene carbonate. FIGS. 5A-5C depict the cyclic voltammetry curves of the three polymers when TBACl is dissolved in either aqueous or organic media. In this case, the type of ion that penetrates the polymer for charge compensation (e.g. chloride ion) remains constant and all changes in the cyclic voltammograms should arise due to the influence of solvation effects of the solvent. As it can be observed in FIGS. 5A-5C, there is a clear decrease in the current densities observed in water, compared to the organic solvent, which is attributable to the limited access to redox active sites due to solvation of the electrolyte ions in water combined with the hydrophobic nature of the polymer backbone. The positively shifted oxidation onset, observed for all polymers in aqueous media, further indicates the difficult interaction between the polymer and the hydrated ions. Similar to the trend observed in aqueous $NH_4Cl$, the amide containing ProDOT polymers are much easily oxidised in aqueous TBACl, with P3 exhibiting the most facile oxidation.

Figure 6B:
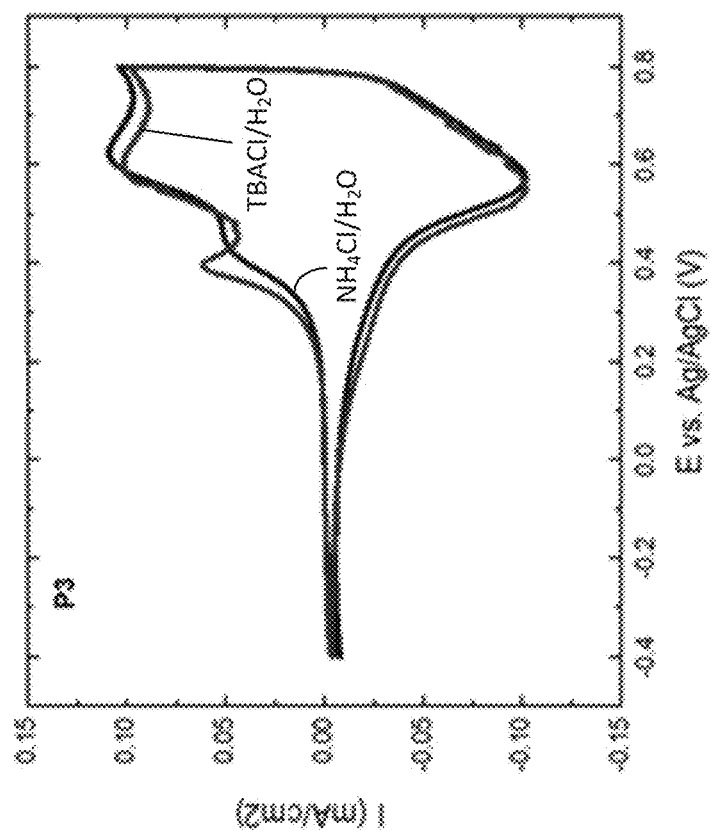
FIGS. 6A-6B are diagrams showing CV data showing impact of the cations in organic and aqueous electrolytes on the redox characteristics of the P3 polymer, according to one example embodiment.
Figure 6A:
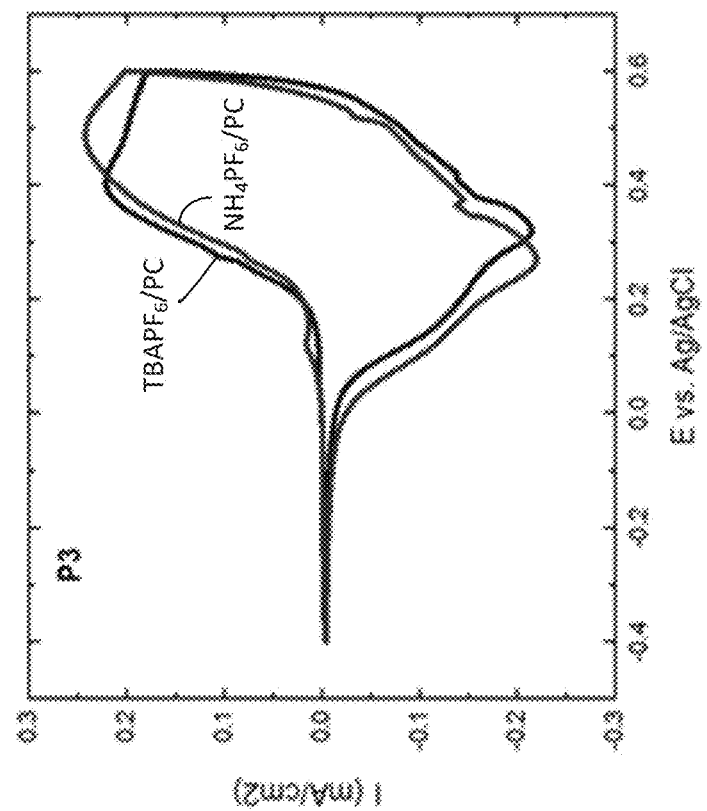
Figure 6D:
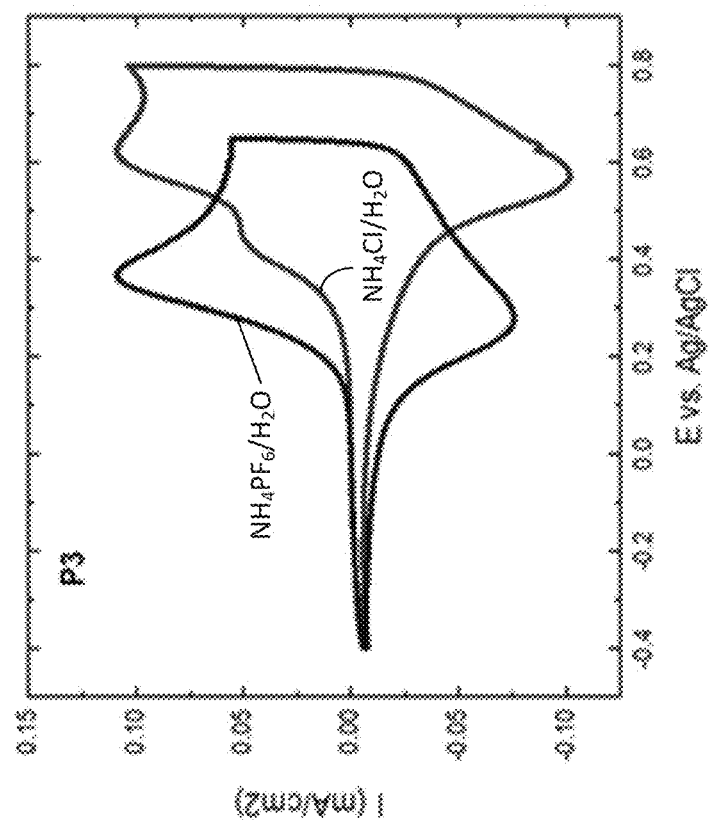
FIGS. 6C-6D are diagrams showing CV data showing impact of the anion in organic and aqueous electrolytes on the redox characteristics of the P3 polymer, according to one example embodiment.
Figure 6C:
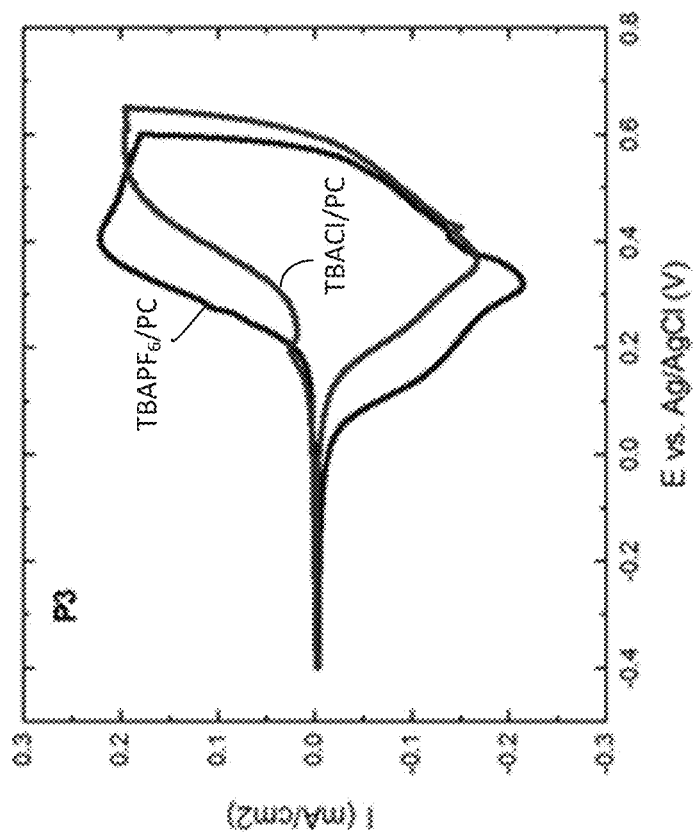

To further understand the impact of the type of salt on the oxidation onset and peak positions, electroactivity of P3 is tested in a series of salts both in organic and aqueous solvents. In both types of solvents, varying the type of cation while keeping the anion constant has minimum effect on the shape and oxidation onset of the CV curve (FIGS. 6A and 6B). However, the anion used in the electrolyte has a major influence on the polymer redox characteristics (FIGS. 6C and 6D). In both organic and aqueous environments, the presence of the $PF_6$ anion lowers the oxidation onset compared to the chloride ion. This effect is more drastic in the case of aqueous electrolytes where the influence of hydration is felt much more. The $PF_6$ anion which is less solvated than the chloride anion, shows a very low oxidation onset, and a complete oxidation within a short potential window, where as in the case of chloride ions, the oxidation onset is shifted to more positive potentials with two clear oxidation peaks showing the difficulty in accessing the redox active sites of the polymer. P1, which contains the hydrophobic side chains, shows electroactivity in aqueous ammonium hexafluorophosphate solutions. These observations provide valuable insights into ease of achieving redox activity in aqueous electrolytes and the impact of anion solvation (hydration) on the ease of oxidation of p-type polymers.

4. Electrochemical Conditioning of Polymer Films

Figure 7A:
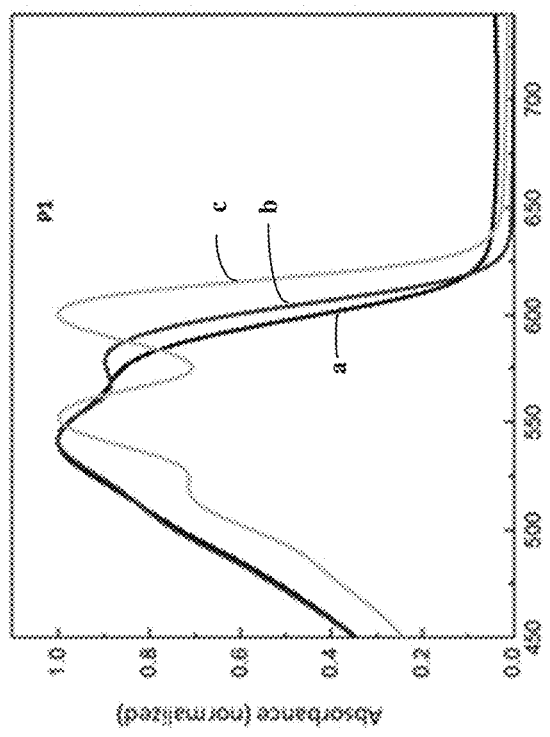
FIG. 7A is a diagram illustrating absorbance spectra from solution to thin film to electrochemically conditioned films in organic (0.2 M $TBAPF_6$/PC) and aqueous electrolytes (0.2 M $NH_4Cl/H_2O$) for ProDOT-$(EtHx)_2$ (P1), according to one example embodiment.
Figure 7C:
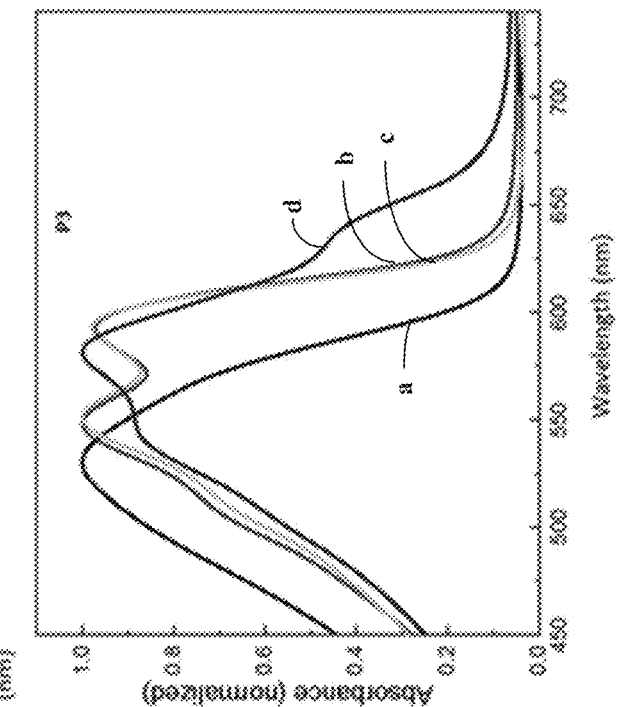
FIG. 7C is a diagram illustrating absorbance spectra from solution to thin film to electrochemically conditioned films in organic (0.2 M TBAPF$_6$/PC) and aqueous electrolytes (0.2 M NH$_4$Cl/H$_2$O) for ProDOT-N(Butyl)$_2$ (P3), according to one example embodiment.
Figure 7B:
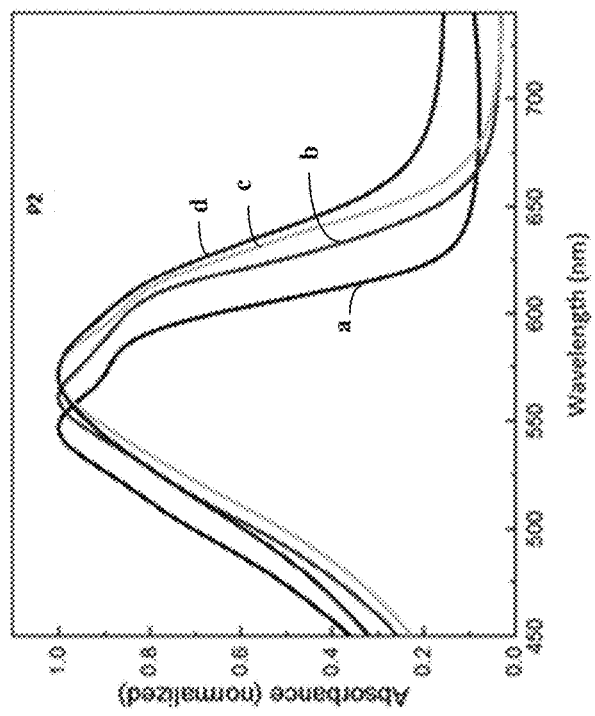
FIG. 7B is a diagram illustrating absorbance spectra from solution to thin film to electrochemically conditioned films in organic (0.2 M $TBAPF_6$/PC) and aqueous electrolytes (0.2 M $NH_4Cl/H_2O$) for ProDOT-N(H)(EtHx) (P2), according to one example embodiment.

Electrochemical processes of conjugated polymers involve ingress and or egress of ions from the electrolyte to maintain charge neutrality of the bulk polymer during doping/de-doping cycles. For example, during the oxidation of p-type polymers, anions from the electrolyte enter the polymer film to compensate for the positive charge created on the polymer backbone, followed by anion dissociation or cation ingress during the reduction process. In order to create favorable pathways for ionic movement, the polymer films may undergo morphology changes, in a process known as electrochemical conditioning or "break-in". These morphology changes upon electrochemical cycling of the three ProDOT polymers can give further insight into the influence of the mono and di-substituted amide side-chains on their electroactivity in different solvents. FIGS. 7A-7C represent the evolution of the normalized absorbance spectra of the polymers P1, P2 and P3 moving from the solution state (a) to pristine thin films (b) and those that are electrochemically conditioned in organic (c) and aqueous (d) electrolytes. The spectra for the electrochemically conditioned films are obtained after performing 10 CV cycles in the respective electrolyte. Absorbance spectrum of P1 (coated on OTS-modified ITO substrates) undergoes a significant red-shift upon electrochemical cycling in 0.2 M $TBAPF_6$ in propylene carbonate with a visual colour change from a pinkish-magenta to purple. The better planarization and conjugation indicate reorganization and improved packing of the polymer chains to allow for the ions to interact with the polymer. However, in the case of P2 the original morphology of the pristine film is mostly retained after electrochemical conditioning, probably as it already forms a more conjugated morphology when cast into a thin film. The di-substituted amide containing ProDOT polymer exhibits an intermediate behaviour, with minimum morphology change when cycled in organic electrolytes but a dramatic increase in conjugation when cycled in aqueous solvents. We hypothesize that the reason for the discrepancy in the extent of morphology change shown by P2 and P3 in aqueous electrolytes arise from the degree of polarity (hydrophilicity) of the side chain. P2 with the more hydrophilic side chain could allow the hydrated chloride ions to penetrate the film more easily than P3, which has the di-butyl substituted amide side chain, causing it to undergo rearrangement so as to facilitate hydrated ion movement in and out of the polymer film.

5. Electrochromic Switching Stability

The impact of the addition of an amide functionality on the electrochromic cycling stability is studied in a three-electrode setup using double potential chronoamperometry while simultaneously recording the transmittance of the bleached and colored stated at the wavelength of maximum absorbance. The switching stability is tested after electrochemical conditioning in the respective electrolyte for ten CV cycles. The conditions used for double potential chronoamperometry are as follows: In $TBAPF_6/PC$; P1 (1.0 V, −0.2 V), P2 (1.0 V, −0.2 V) and P3 (0.6 V, −0.4 V) with each potential held constant for 30 seconds. In $NH_4Cl/H_2O$; P2 (0.9 V, −0.4 V) and P3 (0.8 V, −0.4 V) with positive potential held constant for 30 seconds and the negative potential applied for 40 seconds due to the slow colouration. All three ProDOT polymers considered in this study show excellent electrochemical stability in the organic electrolyte 0.2 M $TBAPF_6$/propylene carbonate, maintaining an optical contrast of ≈80% (w.r.t. a blank ITO electrode) when spin coated onto ITO substrates from 20 mg/mL polymer solutions dissolved in $CHCl_3$ (FIG. 8A). In the case of aqueous electrolytes, P3 shows improved electrochromic stability in 0.2 M $NH_4Cl$ (aq) maintaining a contrast of 70% with minimal decrease up to 100 cycles in a three-electrode setup (FIG. 8B). With further cycles, the film transmittance in the coloured state gradually bleaches, probably due to ion-trapping effects and the presence of oxygen that facilitates polymer bleaching. It needs to be noted that in aqueous media while the bleaching process occurs in a short time scale (≈2 s) the colouration is very slow (13.5 s and 11 s respectively for P2 and P3 respectively). Polymer P2 undergoes worse ion trapping and has slower coloration in aqueous electrolytes compared to P3. Although P3 requires greater morphological rearrangement to afford aqueous cyclability than P2, it can be said that the rearranged polymer structure of P3 allows stable switching in aqueous electrolytes. Contrast, coloration efficiencies and switching times for bleaching and coloration in organic and aqueous electrolytes for the amide containing side chain polymers are summarized in Table 1 below.

TABLE 1

Contrast, coloration efficiency, coloration time and bleaching time for P2 and P3 for organic and aqueous electrolytes

| Electrochromic Property | P2 | | P3 | |
|---|---|---|---|---|
| | 0.2M $TBAPF_6$/PC | 0.2M $NH_4Cl/H_2O$ | 0.2M $TBAPF_6$/PC | 0.2M $NH_4Cl/H_2O$ |
| Contrast | 80% (565 nm) | 66% (570 nm) | 76% (550 nm) | 69% (582 nm) |
| Bleaching | | | | |
| Efficiency ($cm^2\ C^{-1}$) | 342 | 498 | 553 | 687.51 |
| Time (s) | 1.0 | 2.2 | 0.8 | 2.3 |
| Coloration | | | | |
| Efficiency ($cm^2\ C^{-1}$) | 436 | 459 | 701 | 389 |
| Time (s) | 0.9 s | 13.5 s | 0.5 s | 11.1 s |

The wavelength at which the transmittance measurements are recorded is indicated in parenthesis for each instance.

Coloration efficiency (CE) calculations and switching times are calculated using transmittance values and times corresponding to 95% of the maximum contrast.

Equation for CE calculation:

$$CE = \log\left(\frac{T_{0.95\Delta\%T}}{T_{initial}}\right)/Q$$

Where $T_{initial}$=initial transmittance, $T_{0.95\Delta\ \%\ T}$= transmittance at 95% of the complete transmittance change, Q=charge density required for the transmittance change.

In summary, In this work we have reported the synthesis of mono and di-substituted amide side-chain containing ProDOT polymers, ProDOT-N(H)EtHx (P2) and ProDOT-N(Butyl)$_2$ (P3). The introduction of a single amide side chain per ProDOT monomer affords aqueous electrolyte compatibility, while lowering the onset of polymer oxidation in both organic and aqueous electrolytes when compared to the widely studied ProDOT polymer ECP-Magenta. Although the current density is smaller in aqueous electrolytes, the polymer films undergo complete bleaching when cycled using oxidizing potentials within the electrolyte stability window maintaining a high contrast. The influence of ion solvation and the identity of the electrolyte salt is further investigated, showing that less solvated anions allow facile oxidation of the polymer film. In terms of electrochromic switching stability, P3 shows the most stable activity in aqueous solvents.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

What is claimed is:

1. An electrochromic polymer, comprising:
   a plurality of π-conjugated repeat units with solubilizing side chains, wherein at least one of the side chains contains an amide functional group, wherein the plurality of π-conjugated repeat units with solubilizing side chains comprises a formula of:

23

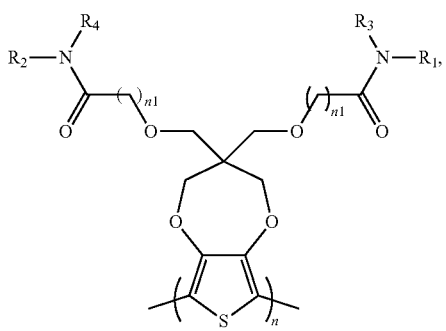

wherein n and n1 are integers greater than 0, and each of $R_1$, $R_2$, $R_3$, and $R_4$ is independently selected from a group including: hydrogen, $C_1$-$C_{30}$ alkyl, $C_2$-$C_{30}$ alkenyl, $C_2$-$C_{30}$ alkynyl, $C_2$-$C_{30}$ alkylcarbonyl, $C_1$-$C_{30}$ alkoxy, $C_3$-$C_{30}$ alkoxyalkyl, $C_2$-$C_{30}$ alkoxycarbonyl, $C_4$-$C_{30}$ alkoxycarbonylalkyl, $C_1$-$C_{30}$ aminylcarbonyl, $C_4$-$C_{30}$ aminylalkyl, $C_1$-$C_{30}$ alkylaminyl, $C_1$-$C_{30}$ alkylsulfonyl, $C_3$-$C_{30}$ alkylsulfonylalkyl, $C_6$-$C_{18}$ aryl, $C_3$-$C_{15}$ cycloalkyl, $C_3$-$C_{30}$ cycloalkylaminyl, $C_5$-$C_{30}$ cycloalkylalkylaminyl, $C_5$-$C_{30}$ cycloalkylalkyl, $C_5$-$C_{30}$ cycloalkylalkyloxy, $C_1$-$C_{12}$ heterocyclyl, $C_1$-$C_{12}$ heterocyclyloxy, $C_3$-$C_{30}$ heterocyclylalkyloxy, $C_1$-$C_{30}$ heterocyclylalkyloxy, $C_1$-$C_{30}$ heterocyclylaminyl, $C_5$-$C_{30}$ heterocyclylalkylaminyl, $C_2$-$C_{12}$ heterocyclylcarbonyl, $C_3$-$C_{30}$ heterocyclylalkyl, $C_1$-$C_{13}$ heteroaryl, or $C_3$-$C_{30}$ heteroarylalkyl.

2. The electrochromic polymer of claim 1, wherein $R_3$ and $R_4$ are hydrogen.

3. The electrochromic polymer of claim 2, wherein $R_2$ is replaced with $R_1$.

4. The electrochromic polymer of claim 3, wherein:

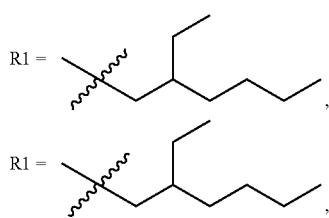

wherein the wave line ∿∿∿ represents connecting points of the polymer units.

5. The electrochromic polymer of claim 1, wherein $R_2$, $R_3$, and $R_4$ are replaced with $R_1$.

6. The electrochromic polymer of claim 5, wherein:

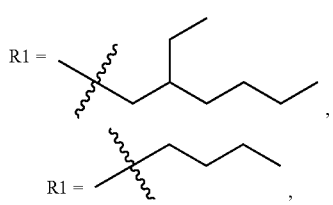

wherein the wave line ∿∿∿ represents connecting points of the polymer units.

7. The electrochromic polymer of claim 1, wherein $R_4$ is replaced with $R_1$, and $R_3$ is replaced with $R_2$.

8. A method of forming the electrochromic polymer of claim 7 comprising contacting a compound of formula 1 with a compound of formula 2 in the presence of a base and a solvent to provide a compound of formula 3:

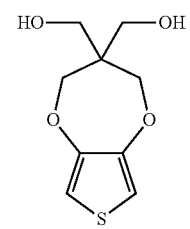

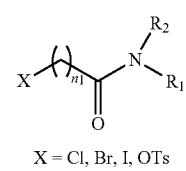

X = Cl, Br, I, OTs

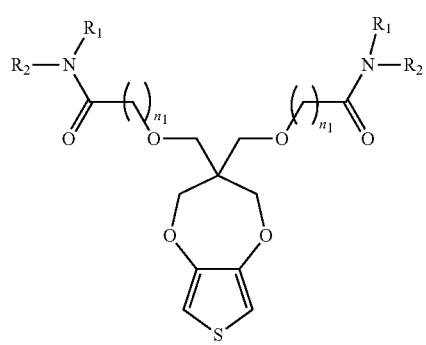

and contacting the compound of formula 3 with an oxidant under oxidative polymerization conditions to provide the electrochromic polymer of claim 7.

9. The method of claim 8, wherein the base includes an alkali metal or a Grignard reagent.

10. The method of claim 9, wherein the base includes one or more of NaH, KH, nBuLi, tBuONa, tBuOK, $K_2CO_3$, $Cs_2CO_3$, or methyl magnesium bromide.

11. The method of claim 8, wherein the solvent includes an aprotic solvent.

12. The method of claim 11, wherein the solvent includes one or more of chloroform, dichloromethane, nitromethane, acetonitrile or toluene.

13. The method of claim 8, wherein the oxidant includes an iron(III) salt, an organic peroxide, or an inorganic peroxide.

14. A method of forming the electrochromic polymer of claim 7 comprising brominating a compound of formula 3 to provide a compound of formula 5

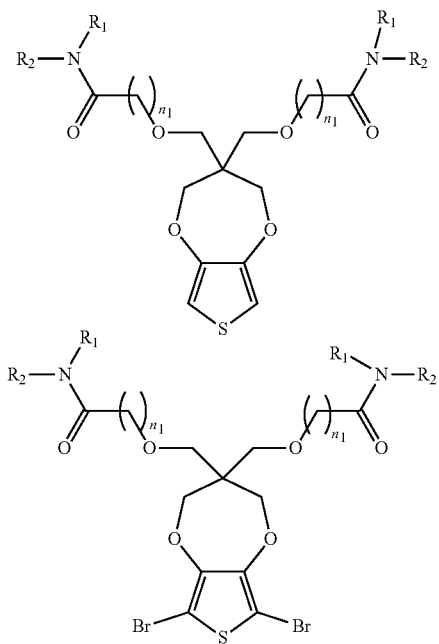

and then contacting the compound of formula 3 with the compound of formula 5 under the presence of a palladium catalyst, a base, and a solvent to provide the electrochromic polymer of claim 7.

15. The method of claim 14, wherein the base includes an alkali metal.

16. The method of claim 14, wherein the solvent includes an aprotic solvent.

17. The method of claim 14, wherein the palladium catalyst is selected from one or more of the following compounds: a palladium(II) catalyst, a palladium(0) catalyst, palladium acetate, bis(triphenylphosphine) palladium (II) dichloride, tetrakis(triphenylphosphine) palladium(0), tris(dibenzylideneacetone) dipalladium(0), or palladium chloride.

18. An electrochromic device comprising the electrochromic polymer of claim 1.

* * * * *